US012629847B2

(12) United States Patent

Ulmer et al.

(10) Patent No.: US 12,629,847 B2

(45) Date of Patent: May 19, 2026

(54) SYSTEM FOR CONTROLLING ROBOTIC END EFFECTORS

(71) Applicant: EMI INTEGRATED SYSTEMS LTD., Ad Halom (IL)

(72) Inventors: Joshua Ulmer, Kochav-Michael (IL); Pavel Batrakow, Holon (IL); Ioav Kela-Kowalsman, Kefar Sava (IL)

(73) Assignee: EMI INTEGRATED SYSTEMS LTD. (IL)

( * ) Notice: Subject to any disclaimer, the term of this patent is extended or adjusted under 35 U.S.C. 154(b) by 102 days.

(21) Appl. No.: 18/293,937

(22) PCT Filed: Aug. 4, 2022

(86) PCT No.: PCT/IL2022/050851

§ 371 (c)(1),
(2) Date: Jan. 31, 2024

(87) PCT Pub. No.: WO2023/012804

PCT Pub. Date: Feb. 9, 2023

(65) Prior Publication Data

US 2025/0073926 A1 Mar. 6, 2025

Related U.S. Application Data

(60) Provisional application No. 63/229,976, filed on Aug. 5, 2021.

(51) Int. Cl.
G06F 17/00 (2019.01)
B25J 13/08 (2006.01)
(Continued)

(52) U.S. Cl.
CPC ........... B25J 15/0491 (2013.01); B25J 13/08 (2013.01); B25J 15/045 (2013.01); B25J 15/0658 (2013.01)

(58) Field of Classification Search
CPC ...... B25J 15/0491; B25J 13/08; B25J 15/045; B25J 15/0658; B25J 19/0025; B25J 15/0408; B25J 19/0029
(Continued)

(56) References Cited

U.S. PATENT DOCUMENTS 4,664,588 A * 5/1987 Newell ................ B23Q 1/0063
414/730
6,484,612 B1 * 11/2002 Miyachi ................... B25J 15/04
82/158
(Continued)

FOREIGN PATENT DOCUMENTS

DE 3844548 A1 10/1989
DE 10245984 A1 4/2004
(Continued)

OTHER PUBLICATIONS

Robotiqs generic robot connection kit (Year: 2025).*
(Continued)

*Primary Examiner* — Ronnie M Mancho
(74) *Attorney, Agent, or Firm* — ISUS INTELLECTUAL PROPERTY LTD; Anthony Jason Mirabito

(57) ABSTRACT

A robotic manipulator comprises: a robotic stand; an articulated robotic arm mounted on said robotic stand; said robotic arm comprising a chain of articulated members, said chain comprises proximal and distal members at ends thereof, an end effector connectable to said distal member; said end effector comprising at least one element of the group consisting of an actuator, a sensor, a contact switch and any combination thereof, a control module further comprising a control circuit, a valve manifold and an electronic signal junction; said control circuit configured for controlling said at valve manifold and electronic signal circuitry and managing said at least one actuator therethrough. The control module is mounted on said robotic stand and provided with
(Continued)

a mounting seat configured for securing said proximal terminal of said robotic arm to said control module.

14 Claims, 18 Drawing Sheets

(51) Int. Cl.
*B25J 15/04* (2006.01)
*B25J 15/06* (2006.01)

(58) Field of Classification Search
USPC ........................................................ 700/245
See application file for complete search history.

(56) References Cited

U.S. PATENT DOCUMENTS

| | | | | |
|---|---|---|---|---|
| 9,840,886 | B1 * | 12/2017 | Gable | ..................... B63C 11/52 |
| 10,857,671 | B2 | 12/2020 | Kinoshita et al. | |
| 11,040,457 | B2 * | 6/2021 | Carruthers | .............. B25J 19/00 |
| 2002/0114659 | A1 | 8/2002 | Binna et al. | |
| 2004/0255543 | A1 | 12/2004 | Ubilla | |
| 2016/0107396 | A1 * | 4/2016 | Berman | ................... B05D 1/02 |
| | | | | 425/510 |
| 2020/0259450 | A1 | 8/2020 | Braunstein et al. | |

FOREIGN PATENT DOCUMENTS

| | | | |
|---|---|---|---|
| DE | 102019125439 | A1 | 3/2021 |
| EP | 1364754 | A2 | 11/2003 |
| EP | 3395732 | A1 | 10/2018 |
| EP | 3983181 | A1 | 4/2022 |

OTHER PUBLICATIONS

PCT International Search Report for International Application No. PCT/IL2022/050851, mailed Mar. 27, 2023, 8pp.

PCT Written Opinion for International Application No. PCT/IL2022/050851, mailed Mar. 27, 2023, 15pp.

PCT International Preliminary Report on Patentability for International Application No. PCT/IL2022/050851, issued Dec. 28, 2023, 34pp.

"Summary of the Office Action" for International Application No. PCT/IL2022/050851, 2023, 13pp.

* cited by examiner

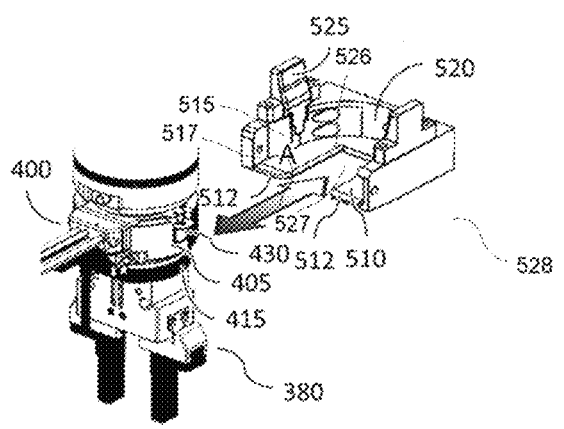
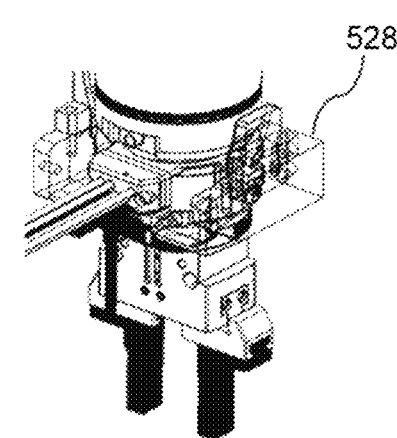
Fig. 7A
Fig. 7B
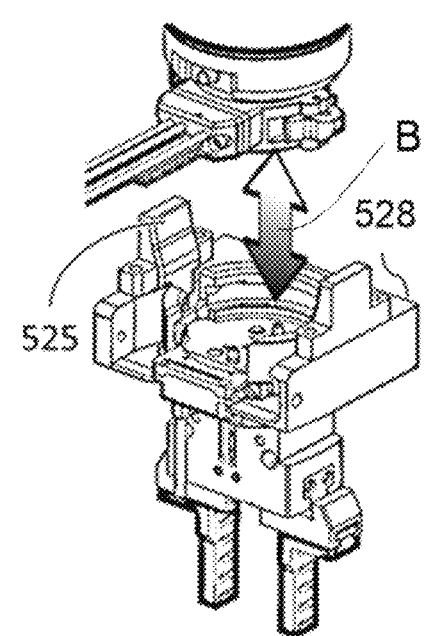
Fig. 7C

SYSTEM FOR CONTROLLING ROBOTIC END EFFECTORS

CROSS REFERENCE TO RELATED APPLICATIONS

This application is a National Phase of PCT Patent Application No. PCT/IL2022/050851 having International filing date of Aug. 4, 2022, which claims the benefit of priority of U.S. Provisional Patent Application No. 63/229, 976, filed Aug. 5, 2021, the contents of which are all incorporated herein by reference in their entirety.

FIELD OF THE INVENTION

The invention is in the field of robotic control, and in particular relates to a system for handling robotic end effectors.

BACKGROUND

Systems and methods for management and operation of robotic end effectors from the robotic arm are priorly disclosed:

U.S. Pat. No. 10,857,671 discloses a robot with a cable harness provided, made up of bundle of a plurality of cables covered with a sheath. The cables and are electric wires to transfer energy (for example, welding power) from the welding controller. Another possible embodiment is that the cables and are hoses to transfer a fluid for cooling purposes. The cable guide is disposed on one side of outer circumference of the base plate opposite to the side on which the connection portion is disposed. The cable guide is fixed to the base plate. The cable guide has a ring shape surrounding a line that is along an axis line to allow the cables, described later to pass through the cable guide. Another cable guide is fixed to the outer surface of connection portions (a surface opposite to the side on which the connection portion is disposed). The cable guide has a ring shape surrounding a line perpendicular to the base plate, and allows the cable to pass through the cable guide.

U.S. Pat. No. 11,040,457 discloses a device for guiding flexible hoses comprising a rigid tube for containing a length of flexible corrugated hose and a spring element. A first end of the spring is fixed to an end of the tube, and a second end of the spring is fixed to an end of the flexible corrugated hose. The flexible corrugated hose may be drawn out of the tube against the force of the spring element, the spring element urging the flexible hose to return to a home position.

U.S. Pat. No. 10,857,671 B2 discloses a robot with a cable harness provided, made up of bundle of a plurality of cables covered with a sheath. The cables and are electric wires to transfer energy (for example, welding power) from the welding controller. Another possible embodiment is that the cables and are hoses to transfer a fluid for cooling purposes. The cable guide is disposed on one side of outer circumference of the base plate opposite to the side on which the connection portion is disposed. The cable guide is fixed to the base plate. The cable guide has a ring shape surrounding a line that is along an axis line to allow the cables, described later to pass through the cable guide. Another cable guide is fixed to the outer surface of connection portions (a surface opposite to the side on which the connection portion is disposed). The cable guide has a ring shape surrounding a line perpendicular to the base plate, and allows the cable to pass through the cable guide.

U.S. Pat. No. 6,484,612 B1 discloses a plurality of connecting members provided to a tool adaptor to which a tool is mounted, a plurality of connecting jaw members having inclined faces which are engaged with and detached from the connecting members when the connecting jaw members are displaced in radial directions, a rod that expands and contracts due to operation of air pressure, and a cam-type converting mechanism for converting the expanding/contracting operation of the rod to operations of displacement of the jaw members are provided to a mounting unit mounted to a robot hand, and a stopper portion for preventing the connecting member from being detached and falling from the inclined face when the air pressure reduces is provided to each the jaw member.

European patent application 1364754 A2 discloses a magazine system for tools in a robotic processing system has each tool fitted with a support plate which has a mounting for the tool and a coupling for docking the tool in a magazine. The magazine is fitted with supports with a corresponding coupling onto which the tool coupling is pushed axially. The two couplings have several aligning slots ridges and the magazine plate has several aligning aids for a secure support for heavy tools.

European patent application 3983181 A1 discloses a tool changer for automatically connecting a tool changer for collaborative robots, a robot tool changer system, and a method for connecting a tool to a robot arm. The tool changer comprises a first tool changer part intended to be mounted to an arm of the robot, the first tool changer part comprising first connecting means; a second tool changer part intended to be mounted to the operating device and comprising second connecting means. The first and second connecting means are arranged for mutual engagement, such that the first and second tool changer part may be connected and disconnected from each other.

The present invention advances the state-of-the-art in management and operation of robotic effectors, as further disclosed below.

SUMMARY

It is an object of the present invention to provide a robotic manipulator comprising: (a) a robotic stand; (b) an articulated robotic arm mounted on the robotic stand; the robotic arm comprising a chain of articulated members, the chain comprises proximal and distal members at ends thereof; (c) an end effector connectable to the distal member; the end effector comprising at least one element of the group consisting of an actuator, a sensor, a contact switch and any combination thereof; and (d) a control module further comprising a control circuit, a valve manifold and an electronic signal junction; the control circuit configured for controlling the at valve manifold and electronic signal circuitry and managing the at least one actuator therethrough.

It is a core purpose of the invention to provide the control module mounted on the robotic stand and provided with a mounting seat configured for securing the proximal terminal of the robotic arm to the control module.

It is another object of the present invention to provide the valve manifold configured to feed a control air pressure to the at least one pneumatically operated actuator via at least one pneumatic line.

It is a further object of the present invention to provide the electronic signal circuitry configured to feed a control electric voltage to the at least one electrically operated actuator and receive signals from the at least one element of the group consisting of a sensor and a contact switch via the at least one electric feedthrough.

It is a further object of the present invention to provide the end effector comprises at least one sensor connected to the control unit.

It is a further object of the present invention to provide the at least one sensor is configured for detecting position of the articulated robotic arm and/or end effector.

It is a further object of the present invention to provide an arrangement for securing a harness to an articulated arm. The aforesaid harness is connectable to an end effector. The articulated arm comprises a sequence of arm members jointly connected to each other. The end effector is mechanically securable to an end member of the robotic arm in a rotatable manner. The arrangement further comprises at least one first harness hanger pivotally secured to at least one of the members of the robotic arm.

It is a further object of the present invention to provide the end member having a middle portion, a first terminal and a second terminal thereof. The end member is jointly connected to a previous member of the sequence of the arm members at the middle portion thereof; the end member comprising a rotational drive embedded therewithin and having an output shaft at the first terminal of the end member; the output shaft engageable with the effector rotatable thereby. The arrangement comprising at least one harness member securing the harness to the robotic arm. The at least one harness member is a first harness hanger pivotably securable to the second terminal of the end member. The first harness hanger is freely rotatable around a rotation axis of the output shaft.

It is a further object of the present invention to provide the second harness hanger comprising a guiding ring pivotally securable to the robotic arm and configured for a freely sliding the harness therewithin.

The arrangement comprises at least one third harness hanger further comprising two clamps unmovably securable to the arm member and harness each and a spring hanger interconnecting the clamps which retightens the harness according to momentary geometry of the articulated robotic arm.

It is a further object of the present invention to provide the arrangement for securing a harness to an articulated arm. The harness comprises a guiding ring pivotally securable to the robotic arm and configured for a freely sliding the harness therewithin.

It is a further object of the present invention to provide an arrangement for securing a harness to an articulated arm. The arrangement comprises at least one third harness hanger further comprising two clamps unmovably securable to the arm member and harness each and a spring hanger interconnecting the clamps which retightens the harness according to momentary geometry of the articulated robotic arm.

It is a further object of the present invention to provide an adapter mechanism for coupling a robotic arm and an end effector. The arrangement comprises first and second parts connectable to the robotic arm and the end effector. The first and second parts having first and second contact surfaces, respectively, releasably couplable to each other.

The first contact surface has at least one recess, the second contact surface has at least one projection conformably insertable into the at least one recess. The first part has at least one spring-loaded member movable therethrough. The projection has at least one cut-out configured for receiving the at least one spring-loaded member when the first and second contact surfaces are coupled to each other. The at least one spring-loaded member and the cutout are conformally edged such that the at least one spring-loaded member when inserted into the cutout releasably presses the first and second portions to each other.

It is a further object of the present invention to provide the first and second parts comprising at least one pneumatic feedthrough each.

It is a further object of the present invention to provide the arrangement comprising a gasket placeable between first and second contact surfaces and sealing a connection between the at least one pneumatic feedthrough belonging the first part and the at least one pneumatic feedthrough belonging the second part.

It is a further object of the present invention to provide the first portion comprising at least two spring-loaded members further comprising latches disposed on opposite sides of the first part, the projection of the second part is a rim for seating having undercuts therewithin; the latches have shoulders thereof carrying wedged surfaces conformal to internal surfaces of the undercuts.

It is a further object of the present invention to provide the first and second portion comprising at least one electrical feedthrough each.

It is a further object of the present invention to provide the at least one electrical feedthrough selected from the group consisting of a power line, a signal line, a control line and any combination thereof.

It is a further object of the present invention to provide adapter mechanism comprising a sensor selected from the group consisting of a status sensor within the end effector, a sensor detecting engagement between the first and second part, an identification sensor configured for recognizing the end effector secured to the first or second part and any combination thereof. The sensor is connectable to the signal line.

It is a further object of the present invention to provide the electrical feedthroughs comprising electrical contact pins and/or electrical contact pads.

It is a further object of the present invention to provide external pneumatic and/or electrical feedthroughs connectable to the pneumatic and/or electric feedthroughs within the arrangement by one of the following: (a) a connector shoe having at least one pneumatic and/or electrical feedthrough therewithin; the connector shoe is placeable within a connector cavity within one of the first and second parts and attachable to the pneumatic and/or electric feedthroughs of one of the first and second contact surfaces forming fluid and/or electric contact between the pneumatic and/or electric feedthroughs of the connector shoe and another of the first and second parts; and (b) a plug-and-socket connector.

It is a further object of the present invention to provide the gasket disposed on first contact surface around the at least one pneumatic channel.

It is a further object of the present invention to provide the gasket on second contact surface around the at least one pneumatic channel.

It is a further object of the present invention to provide the first part secured to the robotic arm; the second part is secured to the end effector. The arrangement further comprises a rack for docking the second part carrying the end effector. Each bracket comprises a recess having edges thereof conformally shaped for receiving the second part to be docked therewithin by moving coupled first and second parts along the edges in a first direction. The bracket comprises first sidewise-located wedged-shaped restrictions parallel to the edges and pressing the spring-loaded members into an open position such that the first part is disconnected from the second part when the second part is pushed into the recess along the edges and connecting the first part to second part by releasing the spring-loaded members which are displaced into a closed position when the second part driven by the first part is withdrawn from the recess.

It is a further object of the present invention to provide the first direction parallel or slightly inclined relative to a ground line such that the second part with the end effector is gravitationally confined within the recess. The first part secured to the robotic arm when disconnected from the second part is drawn upward from the second part.

It is a further object of the present invention to provide the bracket has second sidewise-located wedged-shaped restrictions oriented in a second direction being at a predetermined angle to the first direction such that the spring-loaded members of the first part are pressed into the open position when the first part is drawn in the second direction via the second sidewise-located wedged-shaped restrictions to the second part and released into the closed position when the coupled first and second parts are withdrawn along the second direction.

It is a further object of the present invention to provide the first and second directions orthogonal to each other.

A stroke-extending mechanism for linear translating an object of interest; the mechanism comprising: (a) a first guideway having a first slider movable therealong and carrying a first pivot thereon; (b) a drive moving the first slider; (c) a second guideway having a second slider movable therealong and carrying a second pivot thereon; (d) a lever having a proximal terminal connected to the second pivot; (e) a linkage connected to a distal terminal of the lever and connectable to the object of interest in a freely rotatable manner. The lever has a longitudinal recess therewithin; the first pivot slidably movable within the longitudinal recess in a free manner.

It is a further object of the present invention to provide the second slider comprising at least one stopper limiting rotation of the lever.

It is a further object of the present invention to provide a stroke-extending mechanism for linear translating an object of interest. The aforesaid mechanism comprises: (a) a first guideway having a first slider movable therealong and carrying a pair of first pivots thereon; the pivots are transversely spaced apart from each other; (b) a drive moving the first slider; (c) a second guideway having a second slider movable therealong and carrying two second pivots thereon; (d) two levers; each of the two levers having a proximal terminal connected to the second pivots; (e) two linkages; connected to distal terminals of the two levers and connectable to the object of interest in a freely rotatable manner. The levers have longitudinal recesses therewithin; the first pivots slidably movable within the longitudinal recesses in a free manner.

It is a further object of the present invention to provide the second slider comprising at least two stoppers limiting rotation of the levers.

It is a further object of the present invention to provide a stroke-extending mechanism for linear translating an object of interest. The aforesaid mechanism comprises: (a) a first guideway having a first slider movable therealong and carrying a pair of first pivots thereon; the pivots are transversely spaced apart from each other (b) a drive moving the first slider; (c) a second guideway having a second slider movable therealong and carrying two second pivots thereon; (d) two levers; each of the two levers having a proximal terminal connected to the second pivots and a distal terminal having a third pivot; (e) an elongate member perpendicular to the first and second guideways; the elongate member connectable to the object of interest. The levers have first longitudinal recesses therewithin; the first pivots are slidably movable within the first longitudinal recesses in a free manner; the elongate member have two second longitudinal recesses therewithin; the third pivots are slidably movable within the second longitudinal recesses in a free manner.

It is a further object of the present invention to provide an extrusion article of "I" or "C" profile comprising a middle portion and first and second flanges locating at one side of the article. The first flange is half-V-shaped.

It is a further object of the present invention to provide the extrusion article the second flange has a groove with a first flat edge adjoining to the middle portion and a second half-V-shaped edge It is a further object of the present invention to provide an extrusion article of "I" or "C" profile comprising a middle portion and first and second flanges; at least one of the first and second flanges has a groove with a first flat edge adjoining to the middle portion and a second half-V-shaped edge.

It is a further object of the present invention to provide a jack mechanism for interlocking edges of two members of interest to each other. The mechanism comprises: (a) a pair of rails of a profile selected from the group consisting of an I-shaped profile, a C-shaped profile, and a combination thereof, each rail further comprising a middle portion and first and second flanges locating at one side of the article; the first half-V-shaped flange; the flanges rails facing each other; the rails placeable on the edges; and a top-clamping mechanism further comprising a clamp screw, a clamp and a nut conformal to the half-V shaped flanges. The mechanism is placeable between the two members of interest. The clamp screw is tightenable to interlock the two members of interest.

It is a further object of the present invention to provide each second flange having a groove a first flat edge adjoining to the middle portion and a second half-V-shaped edge. The nut has a ledge shaped conformally to the groove. The nut is provided with a spring plunger releasably restricting the nut before tightening the screw withing the nut and releasing the nut by tightening the screw.

It is a further object of the present invention to provide a jack mechanism for interlocking a pair of rails of a profile selected from the group consisting of an I-shaped profile, a C-shaped profile, and a combination thereof. Each rail further comprising a half-V-shaped flange; the flanges rails facing each other; the mechanism comprising: a pair of pushing members juxtaposable with each other by a screw and a pair of bearing members movable apart from each other; the bearing members are conformally shaped to the half-V-shaped flanges; the pair of bearing members and pair of pushing members having wedged surfaces shaped in a conformal manner such that juxtaposition of the pushing members spaces apart the first and second bearing members and secure the pair of rails to each other pressing on the flange surfaces thereof.

It is a further object of the present invention to provide the jack mechanism comprising at least one guiding rod. The upper bearing member is movable relative to a lower bearing member along the at least one guiding rod.

It is a further object of the present invention to provide the jack mechanism comprising at least one spring supporting the upper bearing member.

It is a further object of the present invention to provide a robotic manipulator comprising: (a) a robotic stand; (b) an articulated robotic arm mounted on the robotic stand; the robotic arm comprising a chain of articulated members jointly connected to each other; the chain comprises proximal and distal members at ends thereof, (c) an end effector connectable to the distal member; the end effector comprising at least one element selected from the group consisting of an actuator, a sensor, a contact switch and any combination thereof; (d) an adapter mechanism for coupling the distal member and the end effector; the arrangement comprising first and second parts connectable to the robotic arm and the end effector; the first and second parts having first and second contact surfaces, respectively, releasably couplable to each other; the first contact surface has at least one recess, the second contact surface has at least one projection conformably insertable into the at least one recess; the first part has at least one spring-loaded member movable therethrough; the projection has at least one cut-out configured for receiving the at least one spring-loaded member when the first and second contact surfaces are coupled to each other; the at least one spring-loaded member and the cutout are conformally edged such that the at least one spring-loaded member when inserted into the cutout releasably presses the first and second portions to each other; (e) a control module further comprising a control circuit, a valve manifold and an electronic signal junction; the control circuit configured for controlling the at valve manifold and electronic signal circuitry and managing the at least one actuator therethrough; the control module is mounted on the robotic stand and provided with a mounting seat configured for securing the proximal terminal of the robotic arm to the control module; (f) an arrangement for securing a harness to the articulated arm; the harness interconnecting the end effector and the control the arrangement further comprises at least one harness hanger pivotally secured to at least one of interconnecting joint of the robotic arm; (g) a gripper rack for docking at least one end effector having at least one bracket for docking the second part the end effector; each bracket comprises a recess having edges thereof conformally shaped for receiving the second part; the bracket comprises first sidewise-located wedged-shaped restrictions parallel to the edges and pressing the spring-loaded members such that the first part is disconnected from the second part when the second part is pushed into the recess along the edges and connecting the first part to second part by releasing the spring-loaded members when the second part driven by the first part is withdrawn from the recess.

It is a further object of the present invention to provide a robotic manipulator comprising: (a) a robotic stand; (b) an articulated robotic arm mounted on the robotic stand; the robotic arm comprising a chain of articulated members jointly connected to each other; the chain comprises proximal and distal members at ends thereof, (c) an end effector connectable to the distal member; the end effector comprising at least one element selected from the group consisting of an actuator, a sensor, a contact switch and any combination thereof; (d) an adapter mechanism for coupling the distal member and the end effector; the arrangement comprising first and second parts connectable to the robotic arm and the end effector; the first and second parts having first and second contact surfaces, respectively, releasably couplable to each other; the first contact surface has at least one recess, the second contact surface has at least one projection conformably insertable into the at least one recess; the first part has at least one spring-loaded member movable therethrough; the projection has at least one cut-out configured for receiving the at least one spring-loaded member when the first and second contact surfaces are coupled to each other; the at least one spring-loaded member and the cutout are conformally edged such that the at least one spring-loaded member when inserted into the cutout releasably presses the first and second portions to each other; (e) a control module further comprising a control circuit, a valve manifold and an electronic signal junction; the control circuit configured for controlling the at valve manifold and electronic signal circuitry and managing the at least one actuator therethrough; the control module is mounted on the robotic stand and provided with a mounting seat configured for securing the proximal terminal of the robotic arm to the control module; (f) a gripper rack for docking at least one end effector having at least one bracket for docking the second part the end effector; each bracket comprises a recess having edges thereof conformally shaped for receiving the second part; the bracket comprises first sidewise-located wedged-shaped restrictions parallel to the edges and pressing the spring-loaded members such that the first part is disconnected from the second part when the second part is pushed into the recess along the edges and connecting the first part to second part by releasing the spring-loaded members when the second part driven by the first part is withdrawn from the recess.

BRIEF DESCRIPTION OF THE DRAWINGS

In order to understand the invention and to see how it may be implemented in practice, a plurality of embodiments is adapted to now be described, by way of nonlimiting example only, with reference to the accompanying drawings, in which

FIGS. 7A, 7B and 7C illustrate a procedure of transporting an end effector to a effector rack, docking an end effector within a rack and undocking an end effector within from a rack, respectively;

DETAILED DESCRIPTION OF THE INVENTION

Figure 1:
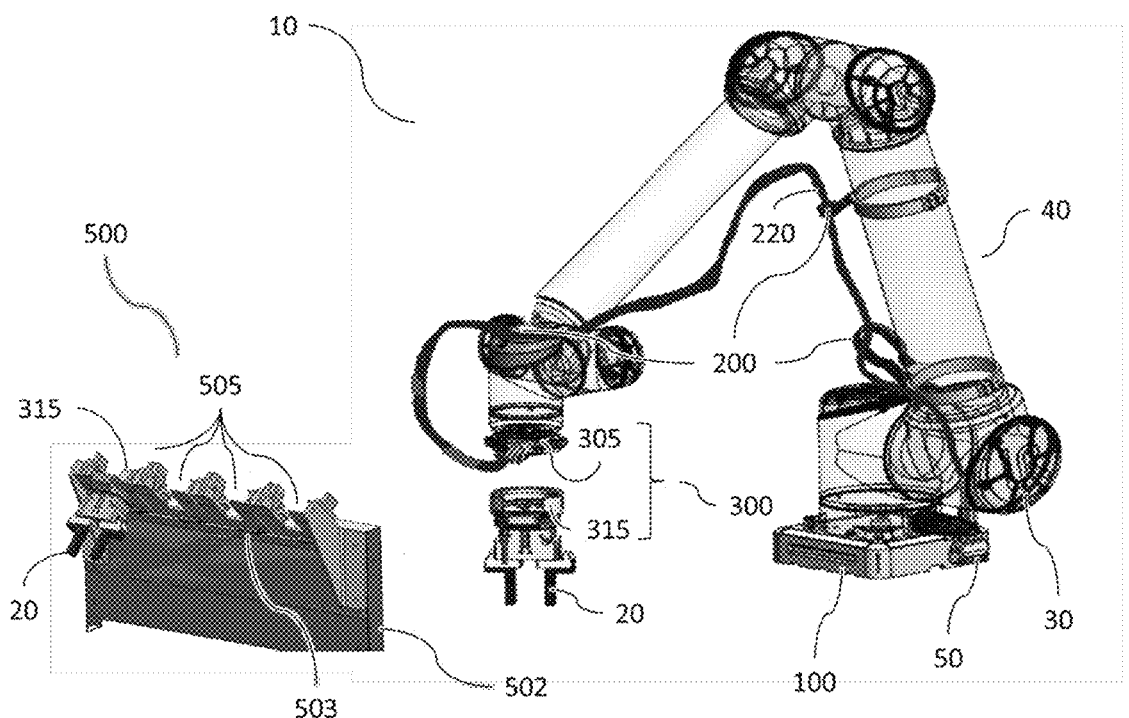
FIG. 1 is an overall isometric view of a system for mechanically manipulating and controlling robotic effectors.

In an aspect of the invention is provided a system for controlling a robotic effector, such as a gripper, independently from a robotic arm. To achieve this effect, connections to the effector are made entirely separately from the robotic arm, Reference is now made to FIG. 1, showing a system 10 for independent control of a robotic effector 20, according to some embodiments of the invention. The system comprises a control unit 100, a harness-slack management system 200, a robot-effector adapter 300, and an effector rack 500.

A brief introduction to each component of the system 10 is now provided, followed by a detailed description of each component in connection with FIGS. 2-7.

The control unit 100 supplies electrical power and signal lines (collectively, electrical lines) and pneumatic control lines to the effector 20. The electro-pneumatic distribution unit 100 is preferably housed, as shown, in a base providing seating and support for the robotic arm 40 on which the effector 20 is mounted. However, the electro-pneumatic distribution unit 100 may be provided in any apparatus whose connection 50 to a harness 220 to the effector 20 disposed close to the shoulder joint 30 of the robotic arm 40.

The harness-slack management system 200 prevents the harness 220 connecting the electro-pneumatic distribution unit 100 and the effector 20 from contacting workpieces and other parts of the work area, as well as from interfering with the robotic arm 40 and effector 20 themselves during robotic operation. The system 200 provides different kinds of support to the harness 220 in three places. In each place, the support minimizes interference, appropriate to the motion of the harness 220 in that place.

The robot-effector adapter 300 includes two separate parts: a robotic-arm portion 305 fixed to the end of the robotic arm 40 and to which the harness 220 is connected, and an effector portion 310 fixed to the effector 20. When so fixed, robot-effector adapters 300 provide universal mechanical fit and interchangeability of the robotic arm 40 with various effectors 20. Furthermore, the robot-effector adapter 300 completes the pneumatic and electrical connections (from the electro-pneumatic distribution unit 100 and through the harness 220) to the effector 20.

The effector rack 500 includes a plurality of effector docks 505 mounted on a structure 502. The multiple docks 505 enabling simplified storage, selection, and interchange of a plurality of effectors 20. Each effector dock 505 may comprise a dock sensor 503, for indicating to a main robotic controller whether an effector dock 505 is occupied by an effector 20.

To remove and dock an effector 20, the effector rack 500 is configured to grasp the effector part 315 and cause separation of the robotic-arm part 305 from the effector part 315, in order to remove and dock an effector 20. Conversely, the rack causes an effector part 315 of an effector 20 in a slot to engage with the robotic arm part 305. In such a manner, the rack 500 provides automatable exchange between several effectors 20 on the robotic arm 40.

In order for the robotic-arm part 305 to dock and disengage, or to engage and undock, an effector part 315, the robotic arm 40 is programmed to move the robotic-arm interface 305 as required for engaging a docked effector part 315 or docking and disengaging from an effector part 315, as further described herein. Alternatively, docking and disengagement, as well as engagement and undocking, may be performed manually.

A "spring-loaded member" is a rigid piece that imparts an opposing force when displaced. The spring effect on the piece may be provided by any opposing-force means known in the art, such as a coil spring, a strip of flexible material, a pneumatic spring, etc. In the present invention, a spring-loaded member is displaced by an external force and is shaped at least partially by a wedged surface, as further described herein.

"Robot-effector adapter" is a standardized arrangement for interchangeably connecting different types of robotic end-of-arm effectors (e.g., grippers) to the end of a robotic arm. A robot-effector adapter comprises a "robotic-arm interface," fixed to the end of a robotic arm, and an "effector interface," to which an effector is fixed. To attach an effector to a robotic arm, the robotic-arm interface is "engaged" with the effector interface, by a clenching mechanism further described herein. Note that the terms "engaged" and "disengaged" are used herein in a transitive sense—the robotic-arm interface disengages is disengaged from the effector interface; as well as in a reflexive sense—the robot-effector adapter engages is engaged. In all cases, which sense of meaning is clear from the context.

Figure 2A:
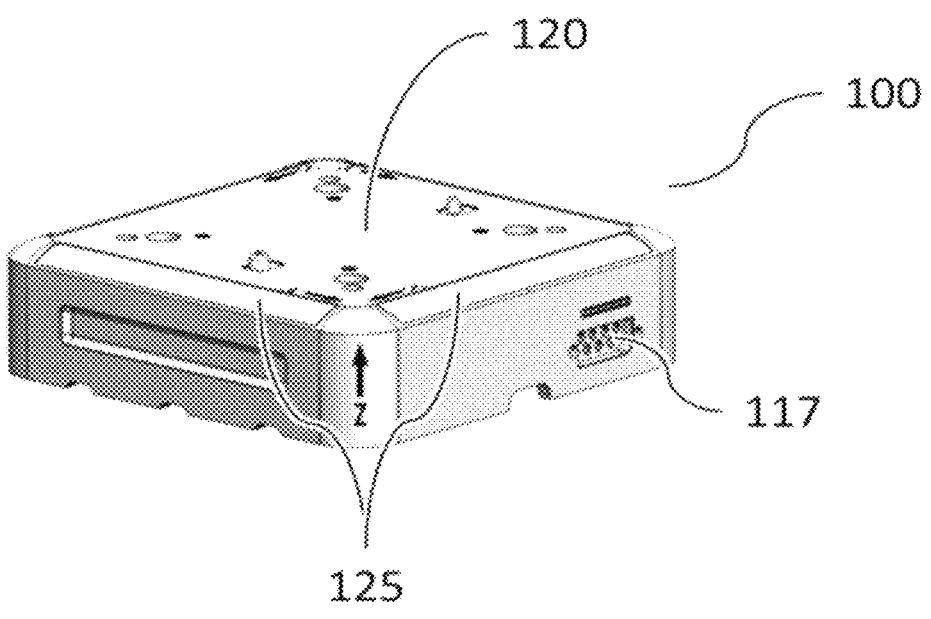
FIGS. 2A and 2B are isometric views a control unit.
Figure 2B:
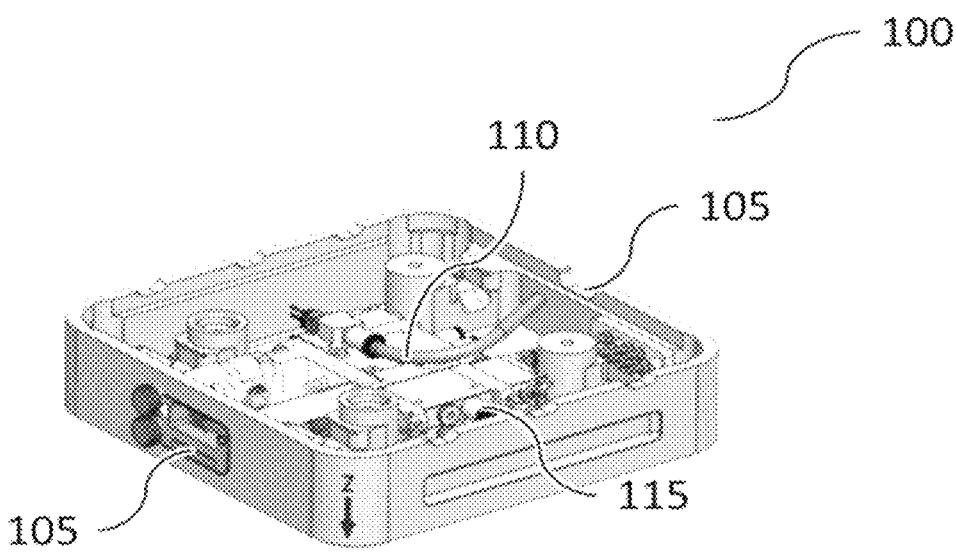

Reference is now made to FIGS. 2A and 2B, showing a control unit 100 to a robotic effector, according to some embodiments of the invention.

A connector 105 (or a plurality of input connectors) is configured for connecting one or more pneumatic control signals and at least one electrical feedthrough lead to an effector. A solenoid inside the unit 100 control the air pressure from the input air channel 110 to a pneumatic line 115 to the effector 20. If there is more than one pneumatic line 115, a manifold inside the unit distributes air from the channel 110 to the pneumatic lines. A connector 117 provides for connection of the pneumatic lines 115 and the electrical feedthrough leads, via a mating connector 205 at one end of a harness 220 (see FIGS. 3A and 3B).

The electrical feedthrough leads may comprise signal and/or power one or more sensors of the effector. For example, binary sensors indicating whether or not an element of the effector is in a particular position.

The control unit 100 may be configured seat and support a robotic arm 40. The control unit 100 may have indicator lights 125. For example, indicating by color whether a robotic system is stopped, waiting, in action, or faulty. The indicator lights 125, which can be LEDs, may be placed around the perimeter of the unit 100. The indicator lights 125 may be seen by operators from a distance, and, being highly visible from all directions, even by an operator presently at another station.

Figure 3A:
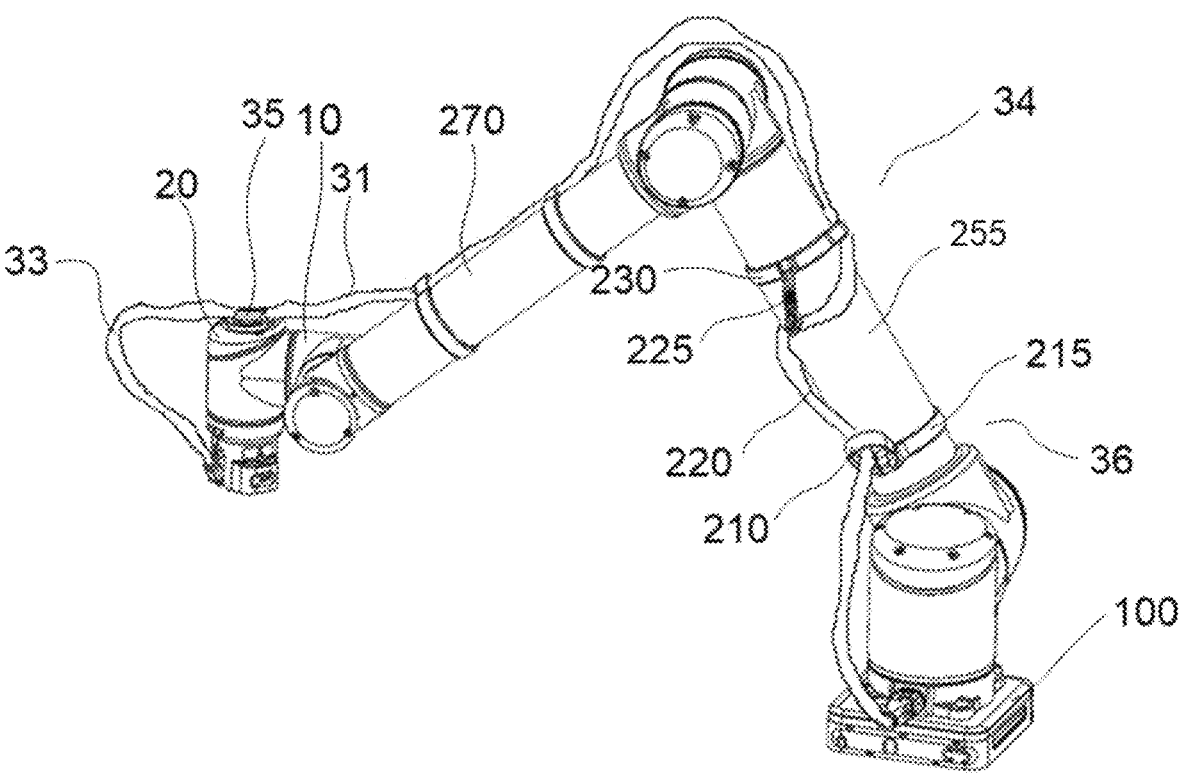
FIGS. 3A and 3B are isometric views of alternative embodiments of a robotic arm provided with a harness arrangement.
Figure 3B:
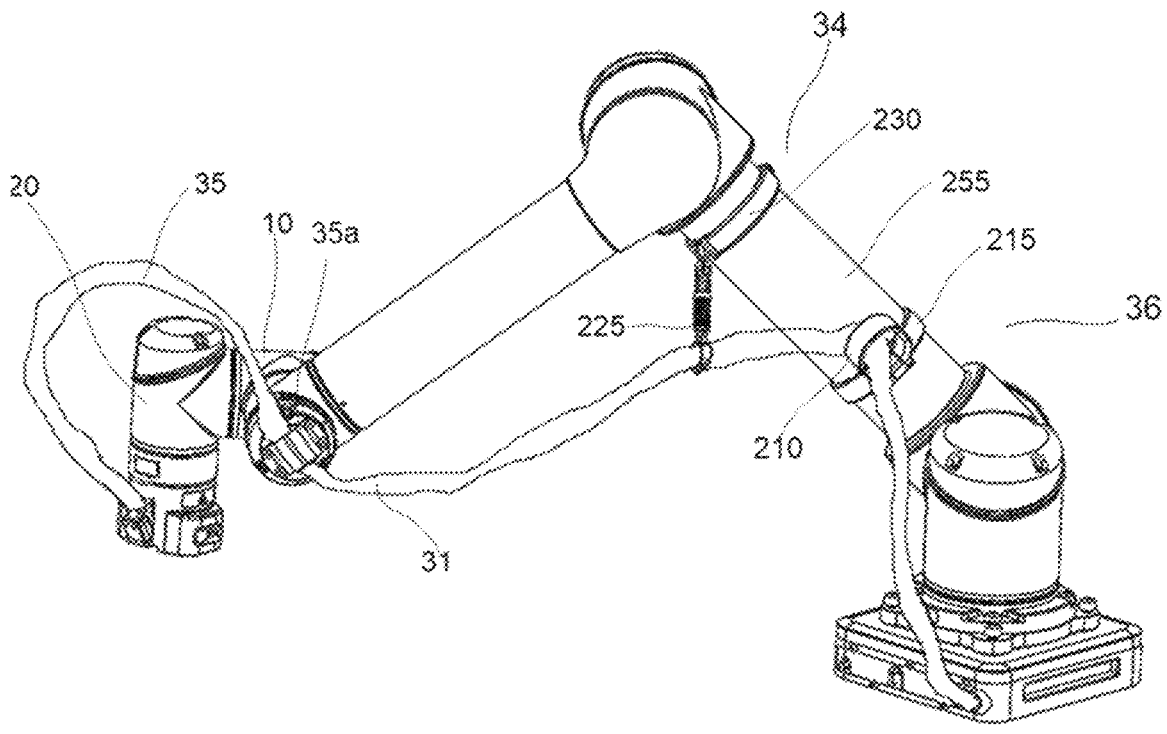

Reference is now made to FIGS. 3A and 3B illustrating alternative locations of pivotal harness hangers 35 and 35a. Additionally, harness hanger 34 comprises clamp 230 secured on robotic arm member 255, a clamp 235 immovably secured to harness portion 220 and spring 225 interconnecting clamps and 230 and 235. Spring 225 retightens harness 220 and prevents it from slacking according to momentary geometry of the articulated robotic arm.

Referring to harness hanger 36, clamp 215 is secured on robotic arm member 255. Harness portion 220 is freely movable in guiding ring 210 such that displacement of harness portion 220 is not hindered by harness hanger 36.

Figure 4:
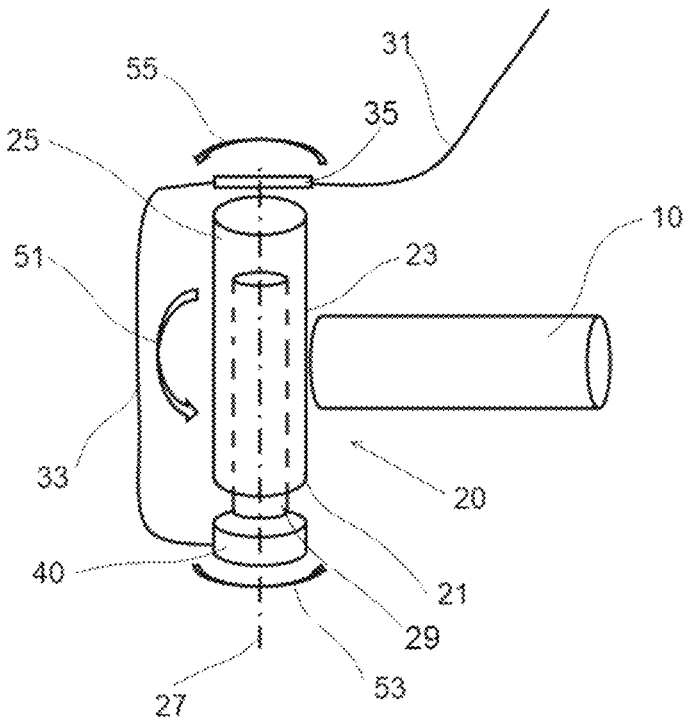
FIG. 4 is a schematic diagram of a harness arrangement for a robotic arm.

Reference is now made to FIG. 4, presenting a schematic diagram of a harness hanger pivotally secured to an end member of a robotic arm. The robotic arm comprises a sequence of members jointly connected to each other (not shown). Numerals 20 and 10 refer to an end member of the robotic arm and a previous member in the aforesaid robotic arm, respectfully. Middle portion 23 of end member 20 is jointly connected to previous member 10 and angularly movable relative to it in an exemplary direction shown by arrow 51. End member 20 is configured for quick-connecting effector 40 at terminal 21. Effector 40 is rotatable by rotational drive 29. Effector 40 is rotatable around axis 27. According to one embodiment of the present invention, rotational drive 29 (for example, an electric motor) is mounted within end member 20 in a coaxial member. Rotatable hanger 35 is pivoted on axis 27. Rotatable hanger 35 holds harness connectable to effector 40. Numerals 31 and 33 refers to the proximal and distal portion of harness held by rotatable hanger 35.

Rotatable hanger 35 is freely rotatable around axis 27. In this case, the tensile force applied to distal portion 33 of the harness is significantly reduced in comparison with fixed securement of the harness to end member 20.

A robot-effector adapter enables mechanical connection of a pneumatic robotic effector to a robotic arm. The robot-effector adapter comprises a robotic-arm part—connected to a robotic arm—and an effector part connected to a pneumatic robotic effector. When the robotic-arm part and the effector part are engaged, one of the parts is seated against the other, as further described herein. The shapes of the parts are matched so that the seating forms a contact surface-preferably but not necessarily flat-between the robotic-arm part and the effector part. Both parts include one or more pneumatic feedthroughs-upper pneumatic feedthroughs of the robotic-arm part and lower pneumatic feedthroughs of the effector part. The upper and lower pneumatic feedthroughs meet at the contact surface of the seated parts.

The robot-effector adapter further comprises one or more spring-loaded members. The spring-loaded members are part of a clenching mechanism comprising pairs of mateable wedged surfaces: one wedged surface of each pair is on the spring-loaded mechanism, which can be mounted on either the robotic arm part or the effector part, and the other wedged surface is on the other part (the one not containing the spring-loaded mechanism).

To engage a robotic arm part with an effector part, the spring-loaded members are compressed. In some embodiments, the compression made by applying a force externally to the adapter. The two parts are seated and then, upon release of the spring-loaded members, the reverse forces of the spring-loaded members cause the mateable wedged surfaces to grasp each other, thereby applying a compressive force on the seated parts, such that the two parts are pressing each other at the contact surface, thereby impinging on O-rings or gaskets at the contact surface, at the *nexus* of the upper and lower feedthroughs, and thereby providing an airtight seal between the pneumatic feedthroughs of the robotic-arm part and the pneumatic feedthroughs of said effector part.

Figure 5A:
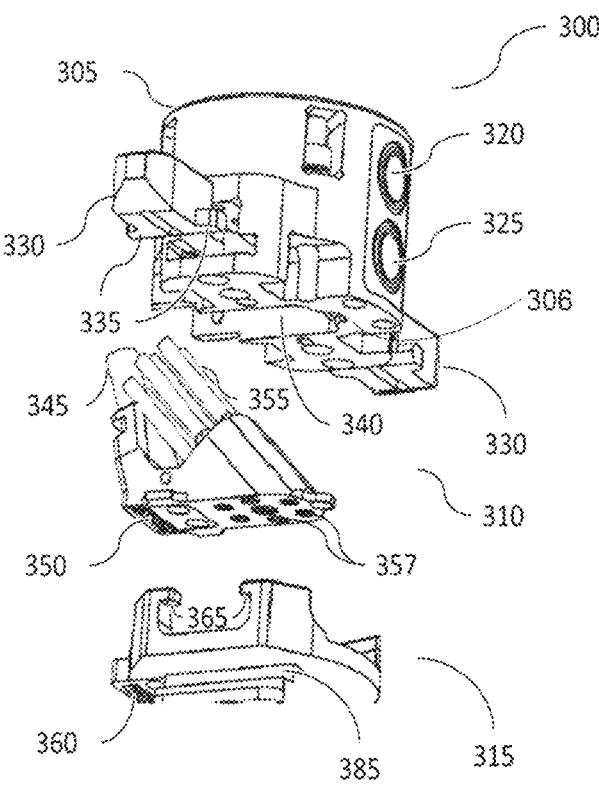
FIGS. 5A and 5B underside and topside exploded isometric views of an arrangement for coupling a robotic arm and an end effector, respectively.
Figure 5C:
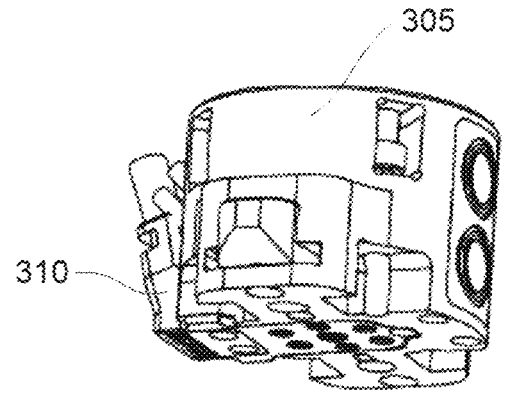
FIG. 5C is an underside isometric view of a portion connectable to a robotic arm and a shoe connector placed therewithin.
Figure 5B:
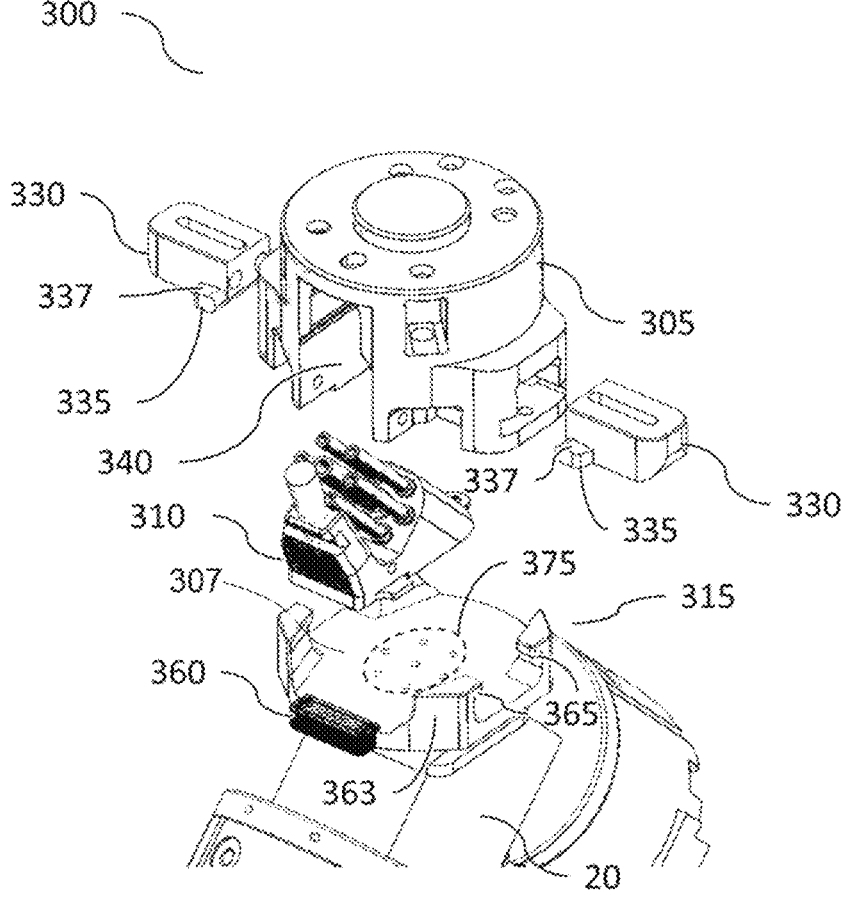

Reference is now made to FIGS. 5A and 5B, showing exploded views of a robot-effector adapter 300, according to some embodiments of the invention. The robot-effector adapter 300 contains a robotic-arm part 305, including an electro-pneumatic shoe connector 310, and an effector part 315. The robotic-arm part 305 is fastened to the end of a robotic arm 40 (shown in FIG. 1) and the effector part 315 is fastened to an effector 20.

When the robotic-arm part 305 is assembled, as shown in FIG. 5C, the shoe connector 310 is seated and fastened in a connector cavity 340 (most evident in FIG. 4B) of the robotic-arm part 305. Preferably, fastening of the shoe connector 310 to the rest of the robotic-arm part 305 is performed during production of the robot-effector adapter 300, whereby the robotic-arm part 305 is provided to the user assembled with the shoe connector 310 and the harness 220.

The shoe connector 310 terminates the harness 220 (shown in FIG. 1). The shoe connector 310 has upper feedthroughs-including upper air channels 357 and an upper electrical connector 350—for pneumatic lines 355 and electrical lines 345 to the effector 20. When the robotic-arm part 305 and the effector part 315 are engaged, the upper feedthroughs are in connection with lower feedthroughs-including lower air channels 375 and a lower electrical connector 360—of the effector part 315, as further described.

The robotic-arm part 305 includes the spring-loaded members, comprising opposing spring-loaded latches 330. The latches 330 are compressed and released during engagement and disengagement, as further described. On the sides of the latches 330 are shoulders 335. The shoulders 335 have wedged surfaces 337, on the proximal sides of the shoulders 335. Preferably, the surface 337 is wedged at an angle in the range of about 5-15°. More preferably, the wedge angle is about 10°.

The effector part 315 includes a rim 363. (In the embodiment shown in FIGS. 5A and 4B, the rim 363 is in four segments around the effector part 315.) The rim 363 defines an area for seating of the robotic arm part 305 against the effector part 315. The rim 363 includes wedged undercuts 365 near opposite sides of the perimeter of the effector part 315. The undercuts 365 are positioned mirroring the wedged surfaces 337 of the robotic-arm part 305. The undercuts 365 are wedged at an equal and opposite angle to the wedged shoulder surfaces 337.

To engage the robotic-arm part 305 with the effector part 315, a user or a suitable mechanism compresses the spring-loaded latches 330; seats the robotic-arm part 305 against the effector part 315; and then releases the latches 330. Upon releasing of the latches 330, the spring forces therefrom cause the wedged undercuts 365 to grasp the wedged shoulder surfaces 337, thereby compressing the robotic-arm part 305 against the effector part 315. O-rings 359, disposed around air channels 357 on the sole of the shoe connector 310, are consequently compressed around air channels 375 of the effector part 315. The compressed O-rings 359 thereby seal the upper and lower pneumatic feedthroughs to the effector 20. Alternatively, or in addition, one or more of the O-rings 359 are disposed around the air channels 375 of the effector part 315.

Electrical feedthrough is established by mating of electrical contact pads 350 of the shoe connector 310 and electrical spring contacts 360 of the effector part 315. Preferably, the shoe connector 310 contains the spring pins and the effector part 315 contains the electrical contact pads; however, the reverse is also possible: the shoe connector 310 can contain electrical contact pads and the effector part 315 can contain electrical spring pins. The electrical contacts can include an effector encoder, enabling a controller to identify or verify the effector 20 connected to the robotic arm 40. The effector encoder can be jumpered within the effector part 315 or at the effector 20 itself. The electrical contacts can include connections to power and signal lines of one or more sensors (not shown), such as an effector status sensor that indicate the present position of manipulators of the effector (e.g., indicate the open and closed statuses of fingers of a gripper). There could be a sensor to detect that the robot-effector adapter 300 is fully engaged, with the latches 330 released to the proper extent. The electrical contacts may also include power and/or signal lines to an effector 20 that has electrical power or control requirements. The control unit is configured for recognizing the effector connected to robotic arm via the aforesaid signal lines.

Disengagement is achieved by compressing the latches 330, thereby releasing the shoulders 335 from the wedged undercuts 365, and then pulling apart the effector part 315 and the robotic-arm part 305.

The effector part 315 may have fork openings 385 on opposite sides, for holding the effector part 315 while it is docked, as further described herein.

Pushbuttons 320, 325 alongside the robotic-arm adapter 305 may be used to activate various functions. For example, one pushbutton 320 may active a free-drive mode of the robotic arm 40 (see FIG. 1), enabling an operator to freely drag the robot to a different position and orientation. Another pushbutton 325 may be used to place the robotic arm in a teaching mode, whereby a controller records and stores the position and orientation for later use.

Figure 6A:
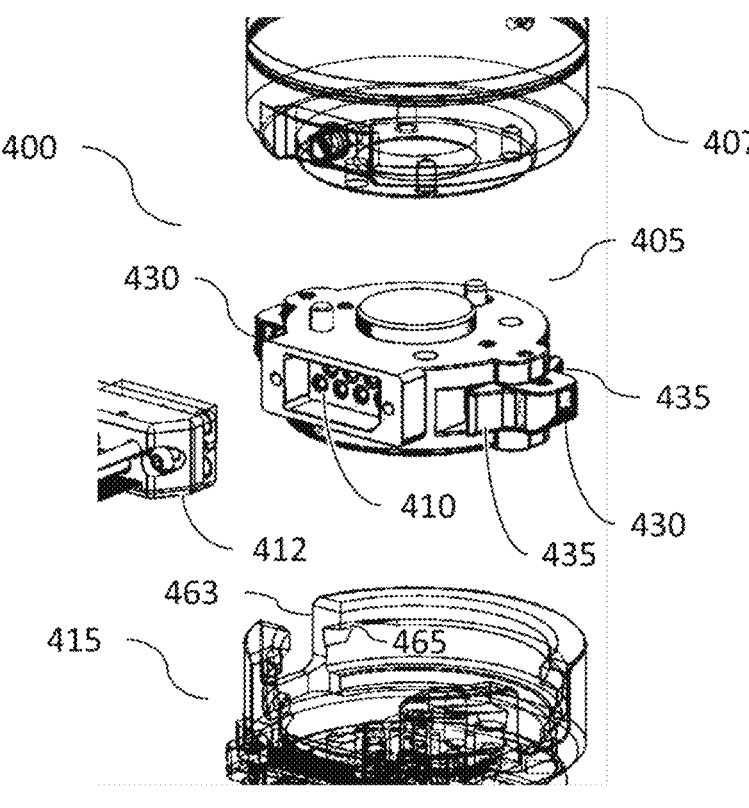
FIG. 6A is an exploded isometric view of an alternative embodiment of an arrangement for coupling a robotic arm and an end effector.

Reference is now also made to FIG. 6A, showing an exploded view of an alternative implementation of robot-effector adapter 400, according to some embodiments of the invention. The robot-effector adapter 400 contains a robotic-arm part 405, and an effector part 415. The robotic-arm part 405 is fastened to the robotic-arm end 407 and the effector part 415 is fastened to a robotic effector (not shown in FIG. 5).

The robotic-arm part 405 has an electro-pneumatic connector socket 410. A mating electro-pneumatic connector plug 412 terminates the harness 220 (shown in FIG. 3). The robotic arm adapter 405 has upper feedthroughs-including upper air channels and upper electrical connectors (not shown)—for pneumatic lines and electrical lines to the effector. When the robotic-arm part 405 and the effector part 415 are engaged, the upper feedthroughs are in electrical and sealed pneumatic connection with lower feedthroughs-including lower air channels and a lower electrical connector (not shown)—of the effector part 415, as further described.

The robotic-arm part 405 includes opposing spring-loaded latches 430. The latches 430 are compressed and released during engagement and disengagement, as further described. On the sides of the latches 430 are shoulders 435. The shoulders 435 have wedged surfaces 437, on the proximal sides of the shoulders 435. Preferably, the surface 437 is wedged at an angle in the range of about 5-15°. More preferably, the wedge angle is about 10°.

The effector part 415 includes a rim 463. (In the embodiment shown in FIG. 5A, the rim 463 is a collar with openings for the latches 430 and connectors 410, 412.) The rim 463 defines an area for seating of the robotic arm part 405 against the effector part 415. The rim 463 includes wedged undercuts 465 near opposite sides of the perimeter of the effector part 415. The undercuts 465 are positioned mirroring the wedged surfaces 437 of the robotic-arm part 405. The undercuts 465 are wedged at an equal and opposite angle to the wedged shoulder surfaces 437.

To engage the robotic-arm part 405 with the effector part 415, a user or a suitable mechanism compresses the spring-loaded latches 430; seats the robotic-arm part 405 against the effector part 415; and then releases the latches 430. Upon releasing of the latches 430, the spring forces therefrom cause the wedged undercuts 465 to grasp the wedged shoulder surfaces 437, thereby compressing the robotic-arm part 405 against the effector part 415. O-rings 459, disposed around air channels on the sole of the shoe connector 410, are consequently compressed around air channels 475 of the effector part 415. The compressed O-rings 459 thereby seal the upper and lower pneumatic feedthroughs to the effector 480. Alternatively, or in addition, one or more of the O-rings 459 are disposed around the air channels 475 of the effector part 415.

For the grasping, the mating of the wedged shoulder surfaces 437 and wedged undercuts 465 can be flush (surface-against-surface contact), but preferably one of each of the mating pairs of surfaces is rounded, so that the mating is made along a contact path rather than a contact surface.

Electrical feedthrough is established by mating of electrical contact pads of the robotic-arm part 405 and electrical spring contacts of the effector part 315 (electrical spring contacts and pads not shown in FIG. 6A). Preferably, the robotic-arm part 405 contains the spring pins and the effector part 415 contains the electrical contact pads; however, the reverse is also possible: the robotic-arm part 405 can contain electrical contact pads and the effector part 415 can contain electrical spring pins. The electrical contacts can include an effector encoder, enabling a robot controller to identify or verify the effector 20 connected to the robotic arm end 407. The effector encoder can be jumpered within the effector part 415 or at the effector 20 itself. The electrical contacts can include connections to power and signal lines of one or more sensors (not shown), such as an effector status sensor that indicate the present position of manipulators of the effector (e.g., indicate the open and closed statuses of fingers of a gripper). There could be a sensor to detect that the robot-effector adapter 400 is fully engaged, with the latches 430 released to the proper extent. The electrical contacts may also include power and/or control lines to an effector that has electrical power or control requirements. Connection of harness 220 (FIG. 1) to effector part 405 is provided by plug-and-socket 412.

Disengagement is achieved by compressing the latches 430, thereby releasing the shoulders 435 from the wedged undercuts 465, and then pulling apart the effector part 415 and the robotic-arm part 405.

Figure 6B:
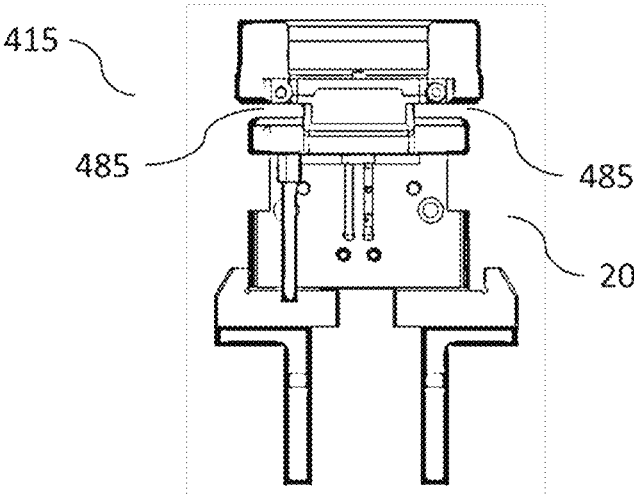
FIG. 6B is a schematic side view of an alternative embodiment of an arrangement for coupling a robotic arm and an end effector.

Reference is now made to FIG. 6b presenting the effector part 415 which may have fork openings 485 on opposite sides, for holding the effector part 415 while it is docked, as further described herein.

While two different embodiments of robot-effector adapter 300, 400 are described herein, it is nevertheless understood that the embodiments can be interchangeable with each other. For example, where one of the embodiments of robot-effector adapter is shown in conjunction with other elements of a system, it is possible to interchange the robot-effector adapter shown with another embodiment of robot-effector adapter in the system.

It is further understood that the disposition of the wedged surfaces may be transposed from that described, i.e. the latches 330, 430 (with shoulders 335, 435 having wedged surfaces) can be on the effector part 315, 415 and the undercuts 365, 465 can be on the robotic-arm part 305, 405.

Reference is now also made to FIGS. 7A-7C, showing an exemplary effector bracket 528 which can be a part of the effector rack 500 shown in FIG. 1—in different stages of docking and undocking, according to some embodiments of the invention. The arrowheads indicate motion directions of the adapter part 400 and stage progressions—the lightly shaded arrowheads for docking and disengagement and the darkly shaded arrowheads for engagement and undocking. In some embodiments, docking of an effector part 415 and disengagement from the robotic-arm part 405—as well as engagement and undocking—may be performed automatically, by the robotic arm 40 moving the robotic-arm part 405, or may be performed manually.

The effector dock 505 has a fork support 510, with one or more prongs. In the embodiment of FIGS. 7A-7C, the fork support 510 has a recess 527 with edges 526 oriented in first direction B. However, the bracket 510 may alternatively comprise, for example, skewers, rods, pegs, hooks, or any combination thereof. According to some embodiments, the effector part 405 has fork openings 485 (shown in FIG. 6B) fit for the bracket 510 to slide through. The bracket 510 may have tapered front edges 512 to facilitate entry of the fork support 510 into the fork openings 485.

Along the inner side walls 517 of the effector dock 505 are wall constrictions 515. In the embodiment shown, the wall constrictions 515 are sloped surfaces in the aforesaid first direction of docking effector part. Alternatively, a wall constriction 515 may be a sudden step in the distance between the inner side walls 517, as in the case, for example, the adapter latches 430 are sloped (much like latch tongues used to close doors) in the first direction. According to one embodiment of the present invention, the first direction (docking direction) is horizontal or slightly inclined to the ground line such that the effector part is gravitationally secured in bracket 510.

Disengaging the effector part 415 from the robotic-arm part 405 and docking the effector part 415 is performed by the following steps: Beginning at FIG. 7A, the fork support 510 is slid e.g., by motion of the effector part 415, moved by the engaged robotic-arm part 405 attached to the robot arm-into the fork openings 485 (see FIG. 6B) of the effector part 415. As the spring latches 430 of the robotic-arm part 405 pass between the inner side walls 517 of the dock 505, the wall constrictions 515 compress the spring latches 430. With the spring latches 430 compressed, the wedged shoulder 435 of the robotic-arm part 405 is ungrasped from wedged undercut 465 of the effector part 415 (see FIG. 7A). The robotic-arm part 405 is thereby freed to retract from the effector dock 505. The effector part 415 is left in the dock 505, supported by the fork support 510.

In some embodiments, the effector dock 505 further comprises a rear wall 520. The rear wall 520 provides for seating of the effector part 415. For optimal seating, the rear wall 520 preferably has the same inner shape as the outer shape of the effector part 415.

Since the effector dock 505 is mounted at a tilted angle in the rack 500 (see FIG. 1; vertical mounting is also possible), the effector part 415 is held steadily in the dock 505 simply by gravity; no locking mechanism is required to secure the effector part 415 in the dock. However, optionally a locking mechanism is provided, with the dock 505 optionally mounted horizontally in the rack 500.

Engaging the robotic-arm part 405 with a docked the effector part 415 is performed by the following steps: Beginning at FIG. 7C, the robotic-arm part 405 approaches the docked effector part 415 along second direction B. As the spring latches 430 of the robotic-arm part 405 pass the constrictions 525, the inner side walls 517 compress the spring latches 430. With the spring latches 430 compressed, the wedged shoulders 435 of the robotic-arm part 405 is positioned for clenching the wedged undercut 465 of the effector part 415 (see FIG. 7A). The clenching and ensuing engagement is affected by sliding the effector adapter 415 out of the dock 505 past the wall constrictions 515. The entire effector adapter 400 is thereby freed from the dock 505 and the effector 20 is ready for action. According to one embodiment of the present invention, directions A and B are orthogonal to each other, but any angle therebetween is in the scope of the present invention.

The robotic-arm part 405 is then seated against the effector part 415. The robotic-arm part 405 seated in the effector part 415 slides out of the U-shaped recess. As the spring latches 430 pass the angled wall guides 515, the spring latches 430 are released and the robotic-arm part 405 is engaged with the effector part 415. The effector part 415 slides off of the fork support 510. The effector 20, now attached to the end of the robotic arm 40, is ready for action.

Figure 8A:
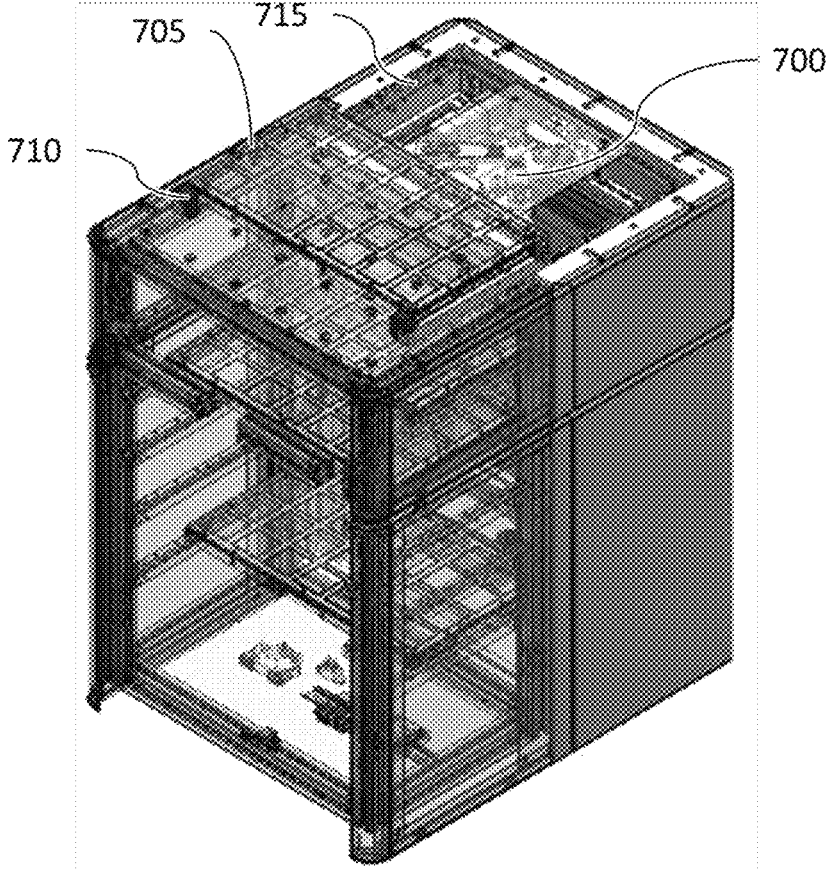
FIG. 8A is an overall view of a stroke extending mechanism mounted within a storing box.

Reference is now made to FIG. 8A. In another aspect of the invention is provided a two-lever stroke extending mechanism 700. In a typical application, the two-lever stroke extending mechanism 700 moves a tray module 705 into position from a tray magazine 710 to a tray table 715, and vice versa. The two-lever stroke extender mechanism 700 improves compactness of a universal linear drive.

Figure 8B:
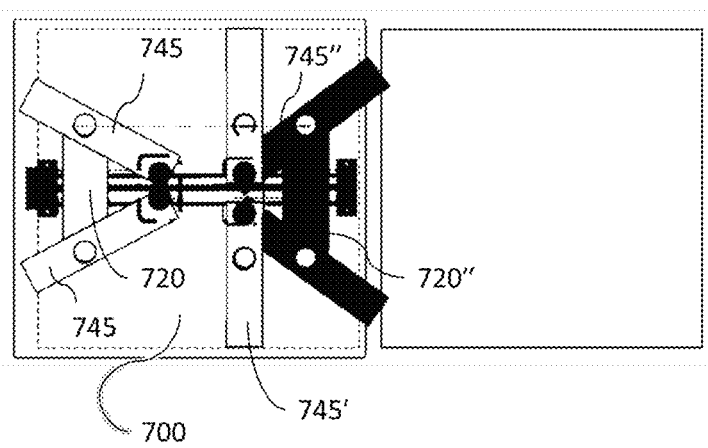
FIGS. 8B and 8C a are schematic top, and exploded isometric views of a two-lever stroke extending mechanism, respectively.

The solution is schematized in FIG. 8B. The two-lever stroke extending mechanism 700 includes one or more lever arms 745 pivoting on a carriage 720, as further described herein. As the carriage 720 traverses its travel distance, pivoting of the lever arms 745 increase the stroke at the ends of the lever arms 745 beyond the carriage travel distance, as further described herein. The traversal, pivoting, and extended stroke is seen at the intermediate 745' and opposite 745" positions of the carriage 720.

Figure 8C:
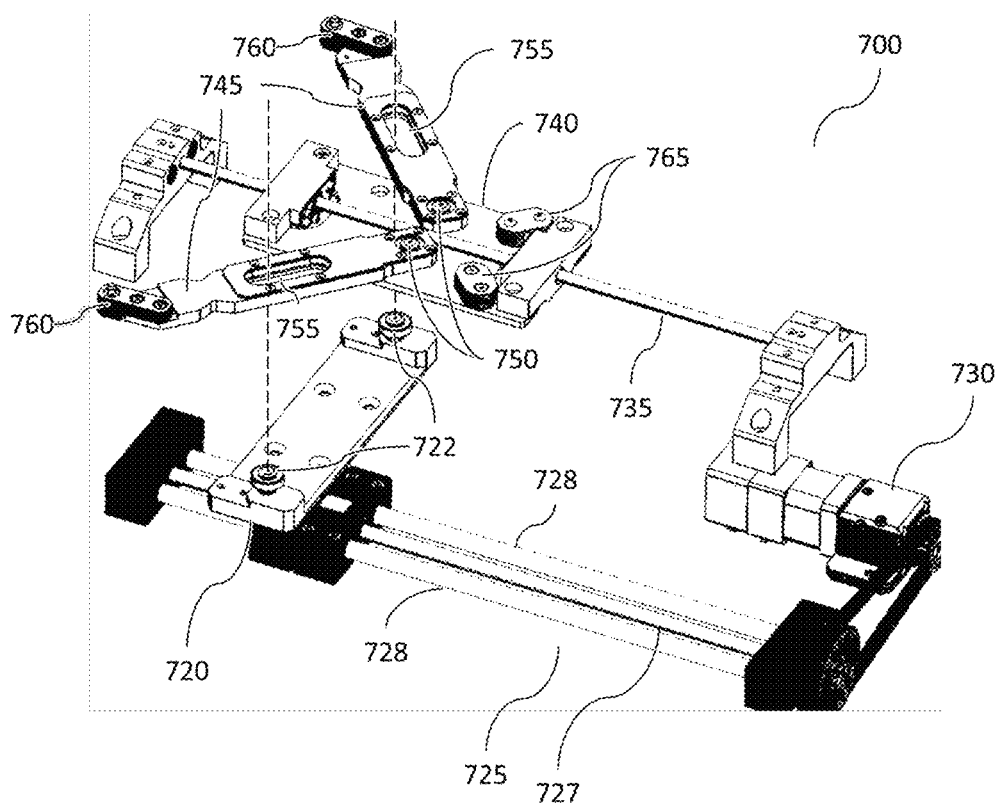
Figure 8D:
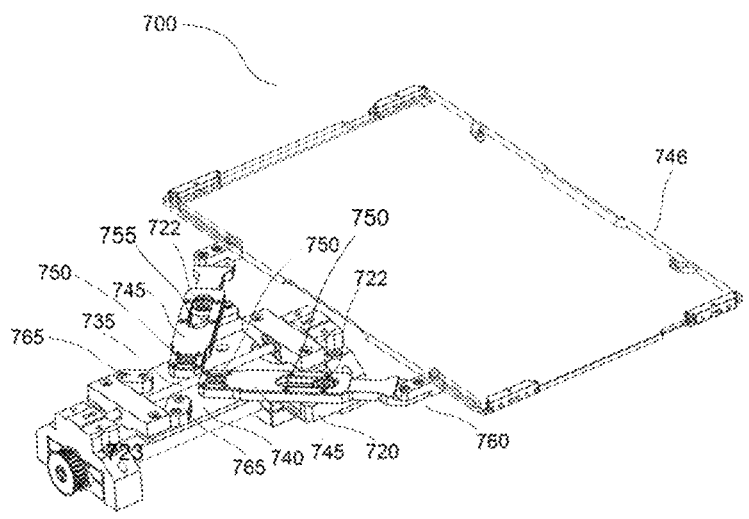
FIGS. 8D and 8E are assembled views of alternative embodiments of a two-lever stroke extending mechanism

Reference is now made to FIGS. 8C and 8D, showing exploded and assembled views of the two-lever stroke extending mechanism 700 according to some embodiments of the invention.

The action of a motor 730 translates a primary carriage 720, along a translation mechanism 725—typically a lead screw 727, rotated by the motor 730, and supporting rods 728—over a translation distance of travel. A secondary carriage 740 is slidable along a secondary translation mechanism 735, typically a rod. Two lever arms 745 are pivoted to the secondary carriage 740 by lever-arm bearings 750, near the inner ends of the lever arms 745. Mechanical linkages 760 are disposed at the outer ends of the lever arms 745. The lever arms 745 each have a lever-arm slot 755, disposed longitudinally along the lever arm 745. Primary pivots embodied as bearings 722 disposed on the primary carriage 720 are insertable into the lever-arm slots 755, and direct lever arm 745 during operation of the stroke extending mechanism 700.

The stroke extending mechanism 700 operates as follows: the motor 730 causes translation of the primary carriage 720.

Translation of the primary carriage 720 over its travel distance causes the guide bearings 722, inserted in the lever-arm slots 755, to 1) translate the secondary carriage 740 along the secondary translation mechanism 735, by an amount substantially equal to the carriage travel distance; and 2) cause the lever arms 745 to pivot about the lever-arm bearings 750. Optionally, the carriages are spring-loaded for returning into their default positions.

The pivoting of the lever arms 745 add to the translation of the towing elements 760. The mechanical linkages 760 are therefore translated, in the direction of carriage translation, by an extended stroke amount exceeding carriage travel distance. The towing elements 760 thereby translate their payload (e.g., a tray mechanism 705) by the extended stroke amount. Numeral 746 refers to a tray to be transported.

Stoppers 765 may be mounted on one or both ends of the secondary carriage 740, in order to limit the pivoting of the lever arms 745 to a maximum angle.

Figure 8E:
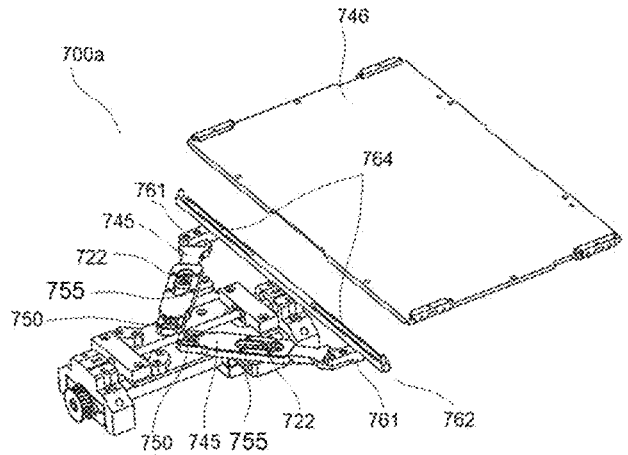

Reference is now made to FIG. 8E illustrating an embodiment of the invention; a link 762 configured with slots, pins and towing features is introduced between towing elements 760 and tray 746. This link moves only on one axis, compared to towing elements 760 moving on 2 axes.

Figure 8F:
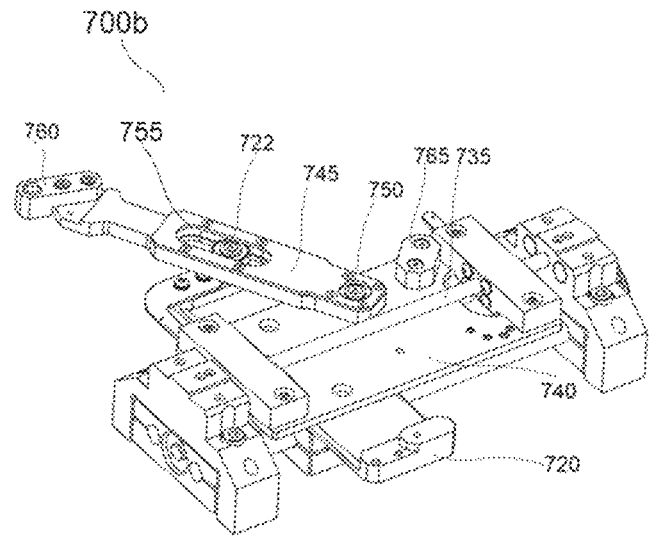
FIG. 8F is an assembled view of a one-lever stroke extending mechanism.

Reference is now made to FIG. 8F presenting an alternative embodiment 700b of the stroke extending mechanism having one lever and operating in a similar manner with embodiment 700.

Figure 9A:
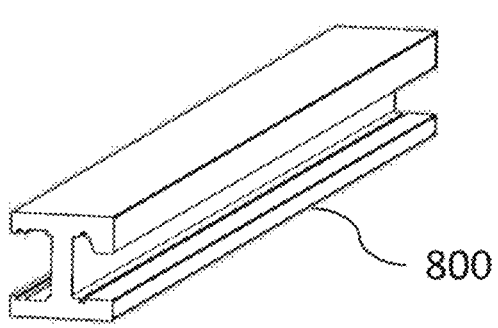
FIGS. 9A and 9B are isometric and end views of an I-shaped extrusion rail, respectively.
Figure 9B:
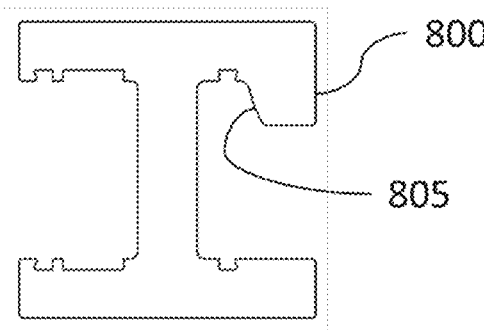
Figure 9C:
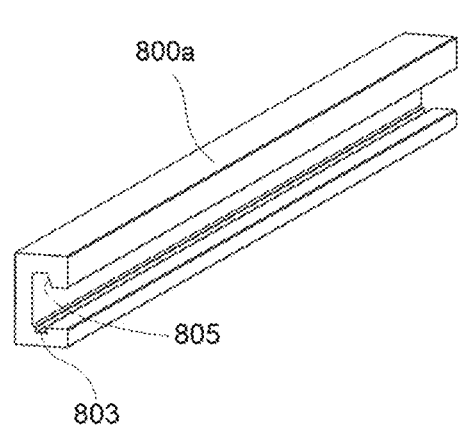
FIGS. 9C and 9D are isometric and end views of a C-shaped extrusion rail, respectively.
Figure 9D:
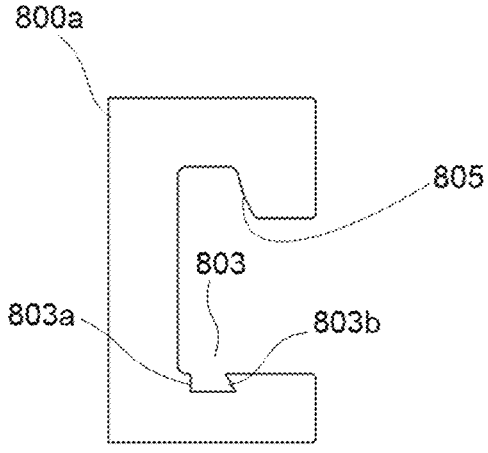
Figure 9E:
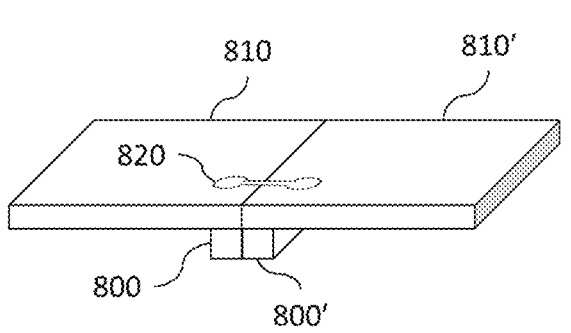
FIGS. 9E and 9F are isometric views of two plates fastened to each other.
Figure 9F:
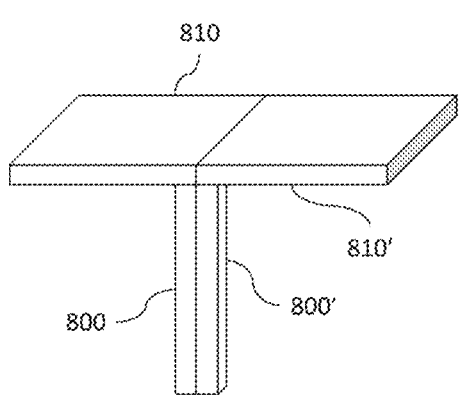

Reference is now made to FIGS. 9A and 9B, showing perspective and profile views, respectively, of an I-profile extrusion rail 800 according to some embodiments of the invention. FIGS. 9C and 9D show perspective and profile views, respectively, of an C-profile extrusion rail 800a. On one side of a flange, the rail has a half-V profile 805. The flange opposite to half-V profile is provided with a groove 821 with first flat edge 803a adjoining to said middle portion and second half-V-shaped edge 803b. The rail is typically made of extruded aluminum and cut, but can be made of any material and by any suitable manufacturing method. Two rails 800, 800' are fastenable in two different modes, depending on how they are used in supporting two plate modules 810, 810'. FIG. 9E shows two rails 800, 800' undergirding two plate modules 810, 810'. A top-clamping mechanism 820 clamps together the rails 800, 800' together and fastens the modules 810, 810' to the rails 800, 800', as further described herein. FIG. 9F shows two rails 800, 800' clamped together with a side-clamping mechanism, as further described herein, serving as a leg supporting two plate modules 810, 810' (such a leg may be used to support any types of mechanical modules).

Figure 9G:
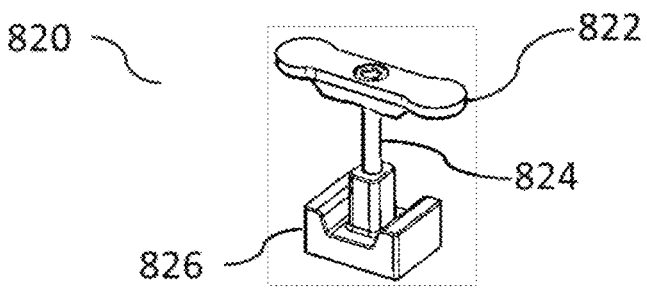
FIG. 9G is isometric view of a first embodiment of a top-clamping mechanism.

Reference is now made to FIG. 9G, showing a top-clamping mechanism 820, according to some embodiments of the invention. The design of the top-clamping 820 mechanism is based on principles of an interlocking connection arrangement described in PCT/IL2021/050032, incorporated herein by reference. The top-clamping mechanism comprises an interlocking insert 822, a top-clamp screw 824, and a V-clamp nut 826.

Figure 9H:
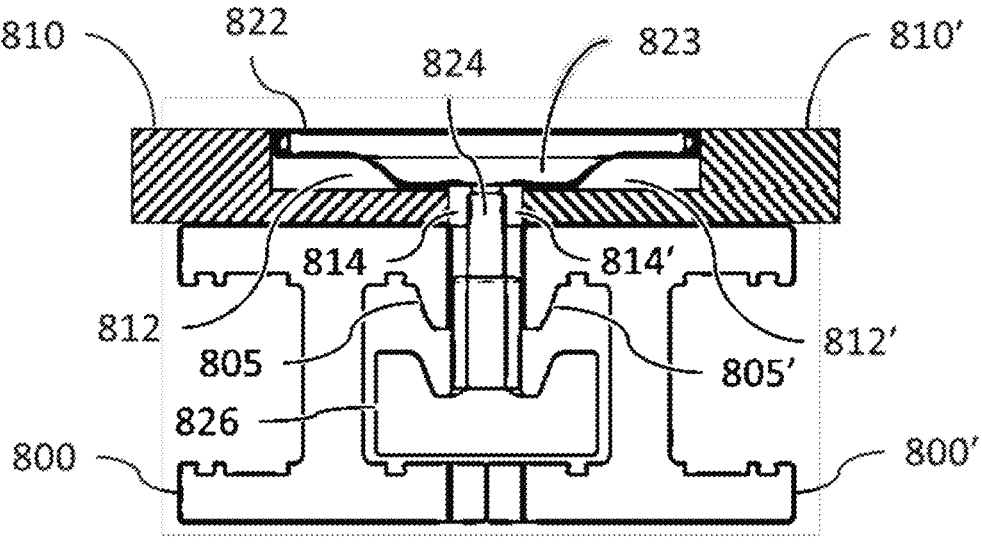
FIGS. 9H and 9I are side views of two plates and a first embodiment of a top-clamping mechanism mounted therebetween in loose and tightened positions, respectively.

Reference is now made to FIG. 9F, showing two plate modules 810, 810', two rails 800, 800' undergirding the plate modules 810, 810', and a top-clamping mechanism 820 arranged for clamping. The interlocking insert 822 is inserted in an opening of two facing recesses 812, 812' of the plate modules 810, 810'. The opening has substantially the same interlocking shape as the interlocking insert 822 (as viewed from the top). Recesses 812 of the present type, and/or recesses as described in PCT/IL2021/050032, may be arrayed in a grid on the edges of a plate module 810, to accommodate multiple interlocking inserts 822 of the present type or inserts as described therein. The interlocking insert 822 preferably has a counterbore, as shown in FIG. 9H, in order for the head of the top-clamp screw 824 to clear the top surface of the plate modules. The top-clamp screw 824 extends downward from the interlocking insert 822, passing through a bore formed from two cutouts 814, 814' of the plate modules. The top-clamp screw 824 is fastened into the V-clamp nut 826, which is disposed in the cavity formed by the profile of the two rails 800, 800' with the half-Vs 805, 805' facing.

Figure 9I:
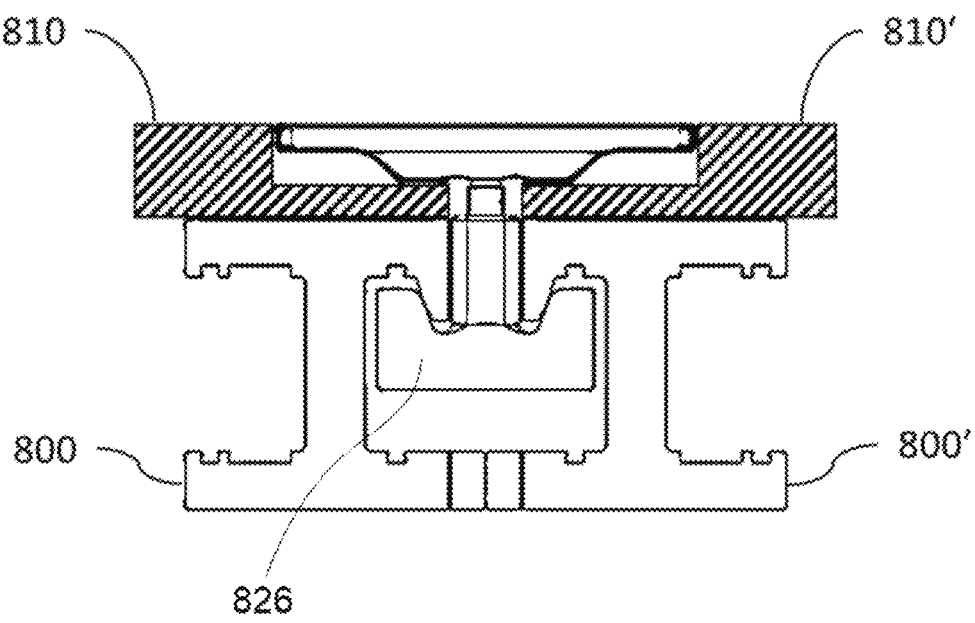

FIG. 9I shows that when the top-clamp screw 824 is tightened, the V-clamp nut 826 impinges on the two half-Vs 805, 805', clamping the two rails 800, 800' together. Additionally, the plate modules 800, 800' and the top flanges, containing the half-Vs 805, 805' of the rails 800, 800' are tightly sandwiched between the interlocking insert 822 and the V-clamp nut 826. The two rails 800, 800' and the two plate modules 810, 810' are thereby tightly clamped together by the top-clamping mechanism 820.

Figure 9J:
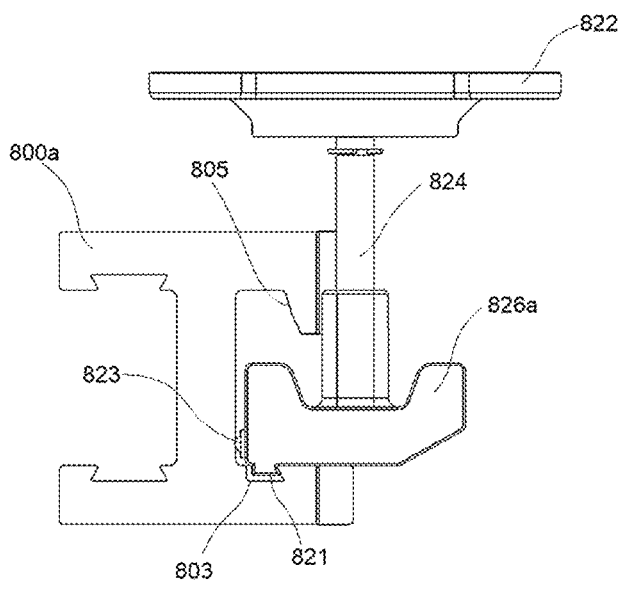
FIG. 9J is a side view of a nut having a pledge inserted into a groove of a C-shaped rail.

Reference is now made to FIG. 9J presenting a side view of a nut having a pledge inserted into a groove of a I-shaped rail. During securing one extrusion profile article 800a to another (not shown), it is helpful to keep nut 826a secured to article 800a. As disclosed above, article 800a is provided with groove 803. Nut 826a has ledge 821 shaped conformally to groove 803 such that ledge 821 is insertable into groove 803. Nut 826 is provided with spring plunger 823. Its function is in keeping nut 826a within groove 803 in an untightened position. Tightening screw 824 in nut 826a forces spring plunger 823 to be compressed and releasing nut 826a from groove 803. In other words, nut 826a is pulled to half-V flanges 805 similar to the position of nut 826 in FIG. 9I.

Figures 10A, 10B:
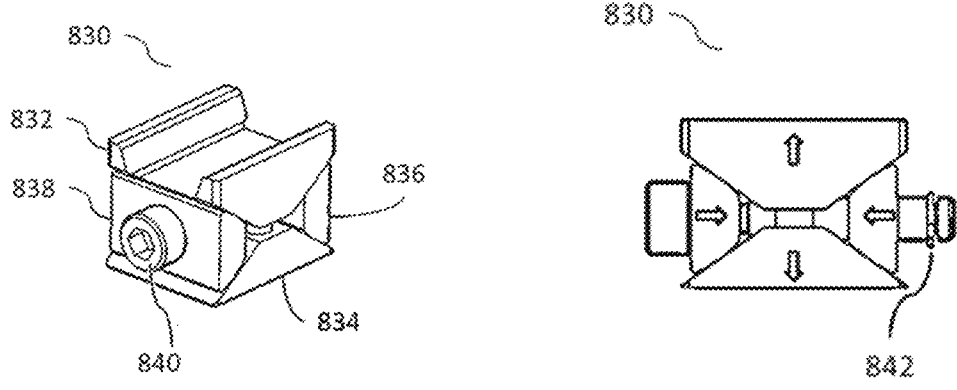
FIGS. 10A and 10B are isometric and side views of a second embodiment of a clamping mechanism, respectively.

Reference is now made to FIGS. 10A and 10B, showing a jack clamp 830, according to some embodiments of the invention. The jack clamp 830 comprises a jack-clamp screw 840 and four trapezoidal elements: a V-clamp platform 832, a base 834, a threaded wedge 836, and a bored wedge 838. When the jack screw 840 is tightened, the bored wedge 838 and threaded wedge 836 approach each other. The approach causes the V-clamp platform 832 and base 834 to space apart, as shown in FIG. 10B. (The jack-clamp screw 840 can be of a captive type, with a retaining ring 842 near the tip, in order prevent the elements of the jack clamp 830 from separating.)

Figure 10C:
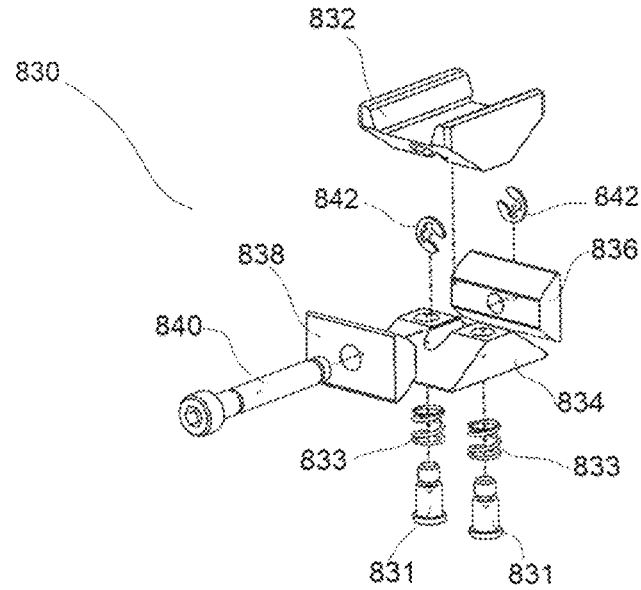
FIG. 10C is an isometric exploded view of a second embodiment of a top-clamping mechanism.

Reference is now made to FIG. 10C presenting an isometric exploded view of a second embodiment of clamping mechanism 830. The aforesaid clamping mechanism further comprises guiding rods 831 defining displacement of upper bearing member 832 relative to lower bearing member 834. Springs sitting on guiding rods 831 support the upper bearing member 832 and facilitates contraction of upper bearing member 832 relative and lower bearing member 834.

Figure 10D:
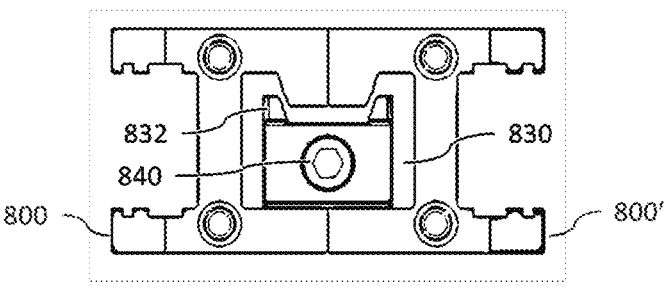
FIGS. 10D and 10E are side views of two rails and a second embodiment of a top-clamping mechanism mounted therebetween in loose and tightened positions, respectively.

Reference is now made to FIG. 10D. jack clamp 830 is disposed in the cavity formed by the profile of the two rails 800, 800' with the half-Vs 805, 805' facing.

Figure 10E:
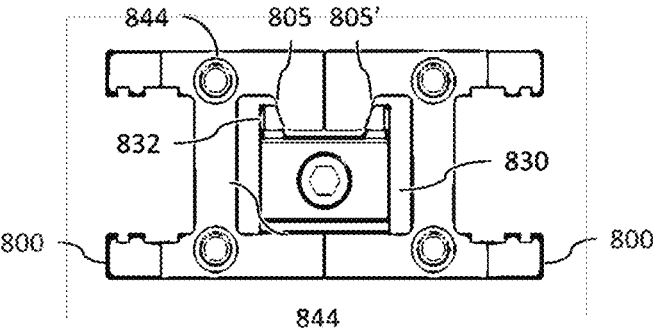

When the jack-clamp screw 840 is tightened, as shown in FIG. 10E, the V-clamp platform 832 impinges on the half-V profiles 805, 805' and the base 834 (seen in FIGS. 8G and 8I) impinges on a floor of the cavity, clamping the rails 800, 800' together.

At the end of the rails may be placed one or more mounting holes 844, for attaching a rail 800 (e.g., to be used as a leg) to a module 810.

US 12,629,847 B2

19

The invention claimed is:

1. An adapter mechanism for coupling a robotic arm and an end effector, comprising:
   a robotic-arm part and an effector part configured to be mutually seated against each other, wherein the robotic-arm part is operable to connect with the robotic arm and the effector part is operable to connect with the end effector;
   a first part among the robotic-arm part and the effector part comprises wedged undercuts;
   a second part among the robotic-arm part and effector part, different from the first part, comprises spring-loaded members with wedged surfaces protruding from sides of the spring-loaded member; and
   the adapter mechanism is further configured for connecting the first part and second part by:
   compressing the spring-loaded members;
   seating the first part against the second part; and
   releasing the spring-loaded members, causing the wedged surfaces to grasp the wedged undercuts, whereby the wedged surfaces and wedged undercuts meet at substantially equal and opposite wedge angles;
   wherein the spring-loaded members extend outside of the second part at opposite extremities, thereby enabling compression of the spring-loaded members by at least one of manually or the second part being passed between external wedged constrictions.

2. The robotic-effector adapter according to claim 1, wherein the robotic-arm part and the effector part each comprise at least at least one pneumatic feedthrough.

3. The robotic-effector adapter according to claim 2, wherein the adapter mechanism comprises at least one O-ring or gasket between the robotic-arm part and the effector, each said O-ring or gasket disposed around a nexus of a said pneumatic feedthrough of the robotic-arm part and a pneumatic feedthrough of the effector part when the robotic-arm part and the effector part are coupled; said O-ring or gasket configured to seal a connection between the pneumatic feedthrough of the robotic-arm part and the pneumatic feedthrough of the effector part.

4. The robotic-effector adapter according to claim 1, further comprising one or more electrical contacts between the robotic-arm part and the effector part, the electrical contacts configured for providing one or more of:
   one or more power and/or signal feedthroughs to a status sensor within the end effector;
   a sensor detecting engagement between the robotic-arm part and the effector part; and
   an identification sensor configured for identification of the end effector secured to the effector part.

5. The adapter mechanism of claim 4, wherein the electrical contacts comprise electrical spring pins mating with electrical contact pads.

6. The adapter mechanism according to claim 1, comprising pneumatic feedthroughs and/or the electrical contacts between the robotic-arm part and effector part, connectable to least one external pneumatic and/or electrical line by one of the following:
   a connector shoe placeable within a connector cavity within the robotic-arm part; and
   a plug-and-socket connection with the robotic-arm part, providing pneumatic and/or electrical continuity between the pneumatic lines and the pneumatic feedthroughs of the effector part and/or between the electrical lines and the electrical contacts of the effector part.

7. A system comprising the adapter mechanism according to claim 1, wherein:
   the effector part is the first part and the robotic-arm part is the second part; and
   the system further comprises a rack comprising one or more docking brackets for decoupling the adapter mechanism and for docking the effector part carrying the end effector; each said docking bracket comprises
   a recess providing edges, conformally shaped for insertion into openings of the effector part for receiving the effector part; and
   first wall constrictions, configured to compress the spring-loaded members of the robotic-arm part when the effector part is moved in a first direction parallel to the edges, such that when the edges are inserted into the openings, the first wall constrictions compress the spring-loaded members to an open position, thereby decoupling the effector part from the robotic-arm part.

8. The system according to claim 7, wherein the first direction is parallel or slightly inclined relative to a ground line, such that the docked effector part is gravitationally confined within the recess; and configured for the robotic-arm part to be drawn away from the effector part docked in the docking bracket, thereby retracting from the docked effector part.

9. The system according to claim 7, configured such that
   said robotic-arm part is movable in a second direction, at a predetermined angle to the first direction, to be seated against the effector part docked in the docking bracket;
   the docking bracket further comprises second wall constrictions, configured to compress the spring-loaded members of the robotic-arm part when the robotic-arm part is moved in the second direction, whereby when the robotic-arm part approaches the docked effector part, the second wall constrictions compress the spring-loaded members to an open position, thereby enabling coupling the effector part to the robotic arm part by retracting the adapter mechanism from the docking bracket in reverse of the first direction.

10. The system according to claim 9, wherein the first and second directions are orthogonal to each other.

11. A robotic manipulator comprising:
   a robotic stand;
   an articulated robotic arm mountable on the robotic stand; the robotic arm comprising a chain of articulated members jointly connected to each other; the chain comprises a proximal member and a distal member at ends thereof;
   an end effector connectable to the distal member of the robotic arm, the end effector comprising at least one element selected from the group consisting of an actuator, a sensor, a contact switch and any combination thereof;
   an electro-pneumatic distribution unit, disposed inside the robotic stand, comprising a valve manifold and electrical feedthrough leads; the valve manifold configured for distribution of air to pneumatic lines to the end effector and the electrical feedthrough leads configured for connection to signal and/or power lines to the end effector;
   a first electro-pneumatic connector, on the robotic base, for external pneumatic and electrical connection to the valve manifold and electrical feedthrough leads;
   a second electro-pneumatic connector for pneumatic and electrical connection of the valve manifold and electrical feedthrough leads to the end effector.

12. The robotic manipulator of claim 11, further comprising a harness and an arrangement for securing the harness to the articulated robotic arm; the harness interconnecting the end effector and the electro-pneumatic distribution unit; the arrangement comprises at least one harness hanger pivotally secured to at least one of interconnecting joints of the robotic arm.

13. A docking bracket, configured for decoupling an effector part of an adapter mechanism connected to an effector from a robotic-arm part of the adapter mechanism connected to a robotic arm; and for docking the effector and effector part, the docking bracket comprising:

a recess having edges, conformally shaped for insertion into openings of the effector part, for receiving the effector part;

first wall constrictions, configured to compress opposing spring-loaded members of the robotic-arm part when the robotic-arm part is moved in a first direction parallel to the edges, such that when the edges are inserted into the openings, the first wall constrictions compress the opposing spring-loaded members to an open position, thereby decoupling the effector part from the robotic part.

14. The docking bracket according to claim 13, configured such that:

the robotic arm part is movable in a second direction, at a predetermined angle to the first direction, in order to be seated against the effector part docked in the docking bracket;

the docking bracket further comprises second wall constrictions, configured to compress the opposing spring-loaded members of the robotic-arm part when the robotic-arm part is moved in the second direction, whereby when the robotic-arm part is seated against the docked second part, the second wall constrictions compress the opposing spring-loaded members to an open position, thereby enabling coupling the effector part to the robotic-arm part by retracting the adapter mechanism from the docking bracket in reverse of the first direction.

* * * * *